United States Patent
Han et al.

(10) Patent No.: US 12,517,749 B2
(45) Date of Patent: Jan. 6, 2026

(54) SIGNAL PROCESSING DEVICE AND DISPLAY APPARATUS FOR VEHICLES INCLUDING THE SAME

(71) Applicant: LG ELECTRONICS INC., Seoul (KR)

(72) Inventors: Dongwoo Han, Seoul (KR); Namyong Park, Seoul (KR); Dongkyu Lee, Seoul (KR); Kyungjun Shin, Seoul (KR); Jaegu Yoon, Seoul (KR); Dukyung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 643 days.

(21) Appl. No.: 17/771,450

(22) PCT Filed: Feb. 22, 2022

(86) PCT No.: PCT/KR2022/002595
§ 371 (c)(1),
(2) Date: Apr. 22, 2022

(87) PCT Pub. No.: WO2022/182103
PCT Pub. Date: Sep. 1, 2022

(65) Prior Publication Data
US 2024/0152370 A1    May 9, 2024

(30) Foreign Application Priority Data

Feb. 26, 2021  (KR) .................. 10-2021-0026453
Apr. 23, 2021  (KR) .................. 10-2021-0053004

(51) Int. Cl.
*G06F 9/455* (2018.01)
*B60K 35/21* (2024.01)
(Continued)

(52) U.S. Cl.
CPC ........ *G06F 9/45558* (2013.01); *B60K 35/213* (2024.01); *B60K 35/22* (2024.01);
(Continued)

(58) Field of Classification Search
CPC ................. G06F 9/45558; G06F 9/544; G06F 2009/45583; G06F 2009/45595;
(Continued)

(56) References Cited

U.S. PATENT DOCUMENTS 8,200,796 B1    6/2012  Margulis
11,403,148 B2 *  8/2022  Lenz ........................ G06F 9/541
(Continued)

FOREIGN PATENT DOCUMENTS

JP    2014139772    7/2014
JP    6523298    5/2019
(Continued)

OTHER PUBLICATIONS

Mohamed Mounir, Hardware-Assisted Virtualization for Heterogeneous Automotive Applications, 2019 IEEE (Year: 2019).*
(Continued)

*Primary Examiner* — Dong U Kim
(74) *Attorney, Agent, or Firm* — LEE, HONG, DEGERMAN, KANG & WAIMEY

(57) ABSTRACT

A signal processing device and a display apparatus for vehicles including the same are disclosed. The signal processing device includes a processor configured to perform signal processing for a display located in a vehicle, wherein the processor is configured to execute first to third virtual machines on a hypervisor in the processor, the second virtual machine is operated for a first display, the third virtual machine is operated for a second display, and the first virtual machine in the processor is configured to execute a camera interface to receive camera data from an external camera
(Continued)

device and a camera manager to register a request for transmission of camera data from the second virtual machine or the third virtual machine and to transmit the camera data to the second virtual machine or the third virtual machine based on registered request. Consequently, data received from the outside may be efficiently shared.

19 Claims, 19 Drawing Sheets

(51) Int. Cl.
    *B60K 35/22* (2024.01)
    *B60K 35/29* (2024.01)
    *G06F 3/14* (2006.01)
    *G06F 9/54* (2006.01)
    *B60K 35/00* (2006.01)
    *B60R 16/023* (2006.01)
    *G09G 5/14* (2006.01)
    *G09G 5/377* (2006.01)

(52) U.S. Cl.
    CPC ............ *B60K 35/29* (2024.01); *G06F 3/1423* (2013.01); *G06F 9/544* (2013.01); *B60K 35/00* (2013.01); *B60K 2360/18* (2024.01); *B60R 16/023* (2013.01); *G06F 3/1438* (2013.01); *G06F 3/1454* (2013.01); *G06F 2009/4557* (2013.01); *G06F 2009/45579* (2013.01); *G06F 2009/45583* (2013.01); *G06F 2009/45595* (2013.01); *G09G 5/14* (2013.01); *G09G 5/377* (2013.01); *G09G 2360/06* (2013.01); *G09G 2370/022* (2013.01); *G09G 2380/10* (2013.01)

(58) Field of Classification Search
    CPC .... B60K 35/22; B60K 35/00; B60K 2360/18; B60R 16/023
    See application file for complete search history.

(56) References Cited

U.S. PATENT DOCUMENTS

| | | | | |
|---|---|---|---|---|
| 11,544,028 | B2* | 1/2023 | Mues | H04L 12/44 |
| 11,550,610 | B2* | 1/2023 | Goldmann | G06F 9/4418 |
| 11,755,355 | B2* | 9/2023 | McDaid | G06F 9/5038 |
| | | | | 718/1 |
| 12,067,428 | B2* | 8/2024 | Gurtovoy | G06F 9/52 |
| 12,112,185 | B2* | 10/2024 | Kobayashi | G06F 9/4887 |
| 2012/0092277 | A1 | 4/2012 | Momchilov | |
| 2013/0031552 | A1 | 1/2013 | Kato | |
| 2014/0149490 | A1 | 5/2014 | Luxenberg et al. | |
| 2015/0178883 | A1 | 6/2015 | McKenzie et al. | |
| 2016/0328254 | A1* | 11/2016 | Ahmed | G06F 9/45545 |
| 2017/0039084 | A1* | 2/2017 | Atsmon | H04L 67/12 |
| 2019/0258251 | A1 | 8/2019 | Ditty et al. | |
| 2020/0026546 | A1* | 1/2020 | Lee | G06F 9/5072 |
| 2020/0117495 | A1 | 4/2020 | Samii et al. | |
| 2020/0159562 | A1 | 5/2020 | Lee et al. | |
| 2020/0192722 | A1* | 6/2020 | Lenz | G06F 9/5077 |
| 2020/0218443 | A1 | 7/2020 | Narayan et al. | |
| 2020/0219322 | A1 | 7/2020 | Verma et al. | |
| 2020/0219469 | A1* | 7/2020 | Mittal | B60K 35/20 |
| 2020/0293357 | A1* | 9/2020 | Goldmann | B60R 16/03 |
| 2020/0326898 | A1* | 10/2020 | Mues | G06F 9/4555 |
| 2020/0326968 | A1 | 10/2020 | Hayes et al. | |
| 2021/0219002 | A1* | 7/2021 | Barnes | B64D 11/00155 |
| 2021/0264559 | A1 | 8/2021 | Roper et al. | |

FOREIGN PATENT DOCUMENTS

| | | |
|---|---|---|
| JP | 2020201761 | 12/2020 |
| KR | 1020110056843 | 5/2011 |
| KR | 1020110088930 | 8/2011 |
| KR | 1020140000328 | 1/2014 |
| KR | 1020200110229 | 9/2020 |
| WO | 2015103376 | 7/2015 |

OTHER PUBLICATIONS

PCT International Application No. PCT/KR2022/002595, International Search Report dated Jun. 16, 2022, 3 pages.
European Patent Office Application Serial No. 22715510.8, Search Report dated Jul. 2009, 9 pages.
Sharma et al., "VSense: Virtualizing Stateful Sensors With Actuators," XP093093221, https://citeseerx.ist.psu.edu/document?repid=rep1&type=pdf&doi=b5d27161f4bf3404e6t84ce71a2f763caaf7475a, Oct. 2023, 14 pages.
Chisnall, "The Definitive Guide to the Xen Hypervisor," XP055728173, ISBN: 978-0-13-234971-0, https://www.mobt3ath.com/uplode/book/book-55475.pdf, Jan. 2008, 307 pages.
PCT International Application No. PCT/KR2021/014950, International Search Report dated Feb. 17, 2022, 3 pages.
European Patent Office Application Serial No. 21878752.1, Search Report dated Feb. 2, 2024, 8 pages.
Chisnall, "The Definitive Guide to the Xen Hypervision," Prentice Hall, Open Source Software Development Series, XP055728173, ISBN: 978-0-13-234971-0, Jan. 2008.
United States Patent and Trademark Office U.S. Appl. No. 17/755,046, Office Action dated Mar. 17, 2025, 59 pages.
U.S. Appl. No. 17/755,046, Office Action dated Aug. 6, 2025, 58 pages.

* cited by examiner

SIGNAL PROCESSING DEVICE AND DISPLAY APPARATUS FOR VEHICLES INCLUDING THE SAME

CROSS-REFERENCE TO RELATED APPLICATIONS

This application is the National Stage filing under 35 U.S.C. 371 of International Application No. PCT/KR2022/002595, filed on Feb. 22, 2022, which claims the benefit of earlier filing date and right of priority to Korean Application Nos. 10-2021-0026453, filed on Feb. 26, 2021, and 10-2021-0053004, filed on Apr. 23, 2021, the contents of which are all incorporated by reference herein in their entirety

BACKGROUND OF THE DISCLOSURE

1. Field of the Disclosure

The present disclosure relates to a signal processing device and a display apparatus for vehicles including the same, and more particularly to a signal processing device capable of efficiently sharing data received from the outside and a display apparatus for vehicles including the same.

2. Description of the Related Art

A vehicle is an apparatus that a driver moves in a desired direction. A representative example of the vehicle is a car.

Meanwhile, a display apparatus for vehicles is located in the vehicle for convenience of users who use the vehicle.

For example, a display is disposed in a cluster in order to display various kinds of information. Meanwhile, in order to display vehicle driving information, various displays, such as an audio video navigation (AVN) display, are located in the vehicle, in addition to the cluster.

In the case in which the number of displays in the display apparatus for vehicles is increased, however, signal processing for the displays is complicated.

In particular, when a plurality of overlays is displayed on a plurality of displays, signal processing is complicated.

SUMMARY

An object of the present disclosure is to provide a signal processing device capable of efficiently sharing data received from the outside and a display apparatus for vehicles including the same.

Another object of the present disclosure is to provide a signal processing device capable of efficiently sharing camera data received from the outside and a display apparatus for vehicles including the same.

Another object of the present disclosure is to provide a signal processing device capable of efficiently sharing position information data received from the outside and a display apparatus for vehicles including the same.

Another object of the present disclosure is to provide a signal processing device capable of efficiently sharing touch input data received from the outside and a display apparatus for vehicles including the same.

Another object of the present disclosure is to provide a signal processing device capable of efficiently sharing sensor data received from the outside and a display apparatus for vehicles including the same.

Another object of the present disclosure is to provide a signal processing device capable of efficiently sharing audio data received from the outside and a display apparatus for vehicles including the same.

Another object of the present disclosure is to provide a signal processing device capable of efficiently sharing data received from the outside even though the number of virtual machines is increased and a display apparatus for vehicles including the same.

A further object of the present disclosure is to provide a signal processing device capable of efficiently sharing data received from the outside even though operating systems of a plurality of virtual machines are different from each other and a display apparatus for vehicles including the same.

In accordance with an aspect of the present disclosure, the above and other objects can be accomplished by the provision of a signal processing device including a processor configured to perform signal processing for a display located in a vehicle, wherein the processor is configured to execute first to third virtual machines on a hypervisor in the processor, the second virtual machine is operated for a first display, the third virtual machine is operated for a second display, and the first virtual machine in the processor is configured to execute a camera interface to receive camera data from an external camera device and a camera manager to register a request for transmission of camera data from the second virtual machine or the third virtual machine and to transmit the camera data to the second virtual machine or the third virtual machine based on registered request.

Meanwhile, the first virtual machine in the processor may further execute an input and output server interface for data communication with the second virtual machine or the third virtual machine, which is a guest virtual machine, and in response to a request for transmission of the same camera data from the second virtual machine and the third virtual machine, the camera manager may transmit first camera data to the input and output server interface.

Meanwhile, the input and output server interface may write the first camera data in a shared memory based on the hypervisor, and the second virtual machine and the third virtual machine may receive the first camera data through the shared memory.

Meanwhile, the camera manager may be configured to initialize the camera device or the camera interface upon booting, and register the request for transmission of the camera data from the second virtual machine or the third virtual machine after booting.

Meanwhile, the camera manager may control setting of the camera data, route control of the camera data, and a stream server of the camera data.

Meanwhile, the first virtual machine in the processor may further execute a position information interface to receive position information data from an external position information receiving device and a position information manager to register a request for transmission of position information data from the second virtual machine or the third virtual machine and to transmit the position information data to the second virtual machine or the third virtual machine based on registered request.

Meanwhile, the first virtual machine in the processor may further execute an input and output server interface for data communication with the second virtual machine or the third virtual machine, which is a guest virtual machine, and in response to a request for transmission of the same position information data from the second virtual machine and the third virtual machine, the position information manager may transmit first position information data to the input and output server interface.

Meanwhile, the input and output server interface may write the first position information data in a shared memory based on the hypervisor, and the second virtual machine and the third virtual machine may receive the first position information data through the shared memory.

Meanwhile, the position information manager may selectively parse the position information data, and may selectively transmit the parsed position information data or unparsed position information data to the second virtual machine or the third virtual machine.

Meanwhile, the first virtual machine in the processor may further execute an input interface to receive input data from an external input device and an input manager to, in response to the received input data being touch input data corresponding to the second virtual machine or the third virtual machine, control transmission of the touch input data to the second virtual machine or the third virtual machine.

Meanwhile, the first virtual machine in the processor may further execute an input and output server interface for data communication with the second virtual machine or the third virtual machine, which is a guest virtual machine, and in response to the input data being touch input data corresponding to the second virtual machine or the third virtual machine, the input manager may transmit the touch input data to the input and output server interface.

Meanwhile, the input and output server interface may write the touch input data in a shared memory based on the hypervisor, and the second virtual machine or the third virtual machine may receive the touch input data through the shared memory.

Meanwhile, the first virtual machine in the processor may further execute a sensor interface to receive sensor data from an external sensor device or microcomputer and a sensor manager to register a request for transmission of sensor data from the second virtual machine or the third virtual machine and to transmit the sensor data to the second virtual machine or the third virtual machine based on registered request.

Meanwhile, the first virtual machine in the processor may further execute an input and output server interface for data communication with the second virtual machine or the third virtual machine, which is a guest virtual machine, and in response to a request for transmission of the same sensor data from the second virtual machine and the third virtual machine, the sensor manager may transmit first sensor data to the input and output server interface.

Meanwhile, the input and output server interface may write the first sensor data in a shared memory based on the hypervisor, and the second virtual machine and the third virtual machine may receive the first sensor data through the shared memory.

Meanwhile, the first virtual machine may receive and process wheel speed sensor data of the vehicle, and may transmit an overlay indicating the processed wheel speed sensor data or speed information corresponding to the processed wheel speed sensor data to at least one of the second virtual machine or the third virtual machine.

Meanwhile, the first virtual machine in the processor may further execute an audio interface to receive audio data from an external audio device and an audio manager to register a request for transmission of audio data from the second virtual machine or the third virtual machine and to transmit the audio data to the second virtual machine or the third virtual machine based on registered request.

Meanwhile, the first virtual machine in the processor may further execute an input and output server interface for data communication with the second virtual machine or the third virtual machine, which is a guest virtual machine, in response to a request for transmission of the same audio data from the second virtual machine and the third virtual machine, the audio manager may transmit first audio data to the input and output server interface, the input and output server interface may write the first audio data in a shared memory based on the hypervisor, and the second virtual machine and the third virtual machine may receive the first audio data through the shared memory.

Meanwhile, in response to the audio data being transmitted to the second virtual machine or the third virtual machine, the audio manager may perform control such that volume is adjusted or audio is played for each of the second virtual machine and the third virtual machine.

In accordance with another aspect of the present disclosure, there is provided a signal processing device including a processor configured to perform signal processing for a display located in a vehicle, wherein the processor is configured to execute first to third virtual machines on a hypervisor in the processor, the second virtual machine is operated for a first display, the third virtual machine is operated for a second display, and the first virtual machine in the processor is configured to execute a camera manager to transmit camera data to the second virtual machine or the third virtual machine, a position information manager to transmit position information data to the second virtual machine or the third virtual machine, an input manager to transmit touch input data to the second virtual machine or the third virtual machine, a sensor manager to transmit sensor data to the second virtual machine or the third virtual machine, and an audio manager to transmit audio data to the second virtual machine or the third virtual machine.

In accordance with a further aspect of the present disclosure, there is provided a display apparatus for vehicles, the display apparatus including a first display, a second display, and a signal processing device including a processor configured to perform signal processing for the first display and the second display, wherein the processor is configured to execute first to third virtual machines on a hypervisor in the processor, the second virtual machine is operated for a first display, the third virtual machine is operated for a second display, and the first virtual machine in the processor is configured to execute a camera interface to receive camera data from an external camera device and a camera manager to register a request for transmission of camera data from the second virtual machine or the third virtual machine and to transmit the camera data to the second virtual machine or the third virtual machine based on registered request.

Effect of the Disclosure

A signal processing device according to an embodiment of the present disclosure includes a processor configured to perform signal processing for a display located in a vehicle, wherein the processor is configured to execute first to third virtual machines on a hypervisor in the processor, the second virtual machine is operated for a first display, the third virtual machine is operated for a second display, and the first virtual machine in the processor is configured to execute a camera interface to receive camera data from an external camera device and a camera manager to register a request for transmission of camera data from the second virtual machine or the third virtual machine and to transmit the camera data to the second virtual machine or the third virtual machine based on registered request. Consequently, data received from the outside may be efficiently shared. In particular, camera data received from the outside may be efficiently shared. In addition, the camera data received from the outside may be efficiently shared even though the number of virtual machines that are driven is increased.

Meanwhile, the first virtual machine in the processor may further execute an input and output server interface for data communication with the second virtual machine or the third virtual machine, which is a guest virtual machine, and in response to a request for transmission of the same camera data from the second virtual machine and the third virtual machine, the camera manager may transmit first camera data to the input and output server interface. Consequently, the camera data may be efficiently shared.

Meanwhile, the input and output server interface may write the first camera data in a shared memory based on the hypervisor, and the second virtual machine and the third virtual machine may receive the first camera data through the shared memory. Consequently, the camera data may be efficiently shared.

Meanwhile, the camera manager may be configured to initialize the camera device or the camera interface upon booting, and register the request for transmission of the camera data from the second virtual machine or the third virtual machine after booting. Consequently, the camera data may be efficiently shared after booting.

Meanwhile, the camera manager may control setting of the camera data, route control of the camera data, and a stream server of the camera data. Consequently, the camera data may be efficiently managed.

Meanwhile, the first virtual machine in the processor may further execute a position information interface to receive position information data from an external position information receiving device and a position information manager to register a request for transmission of position information data from the second virtual machine or the third virtual machine and to transmit the position information data to the second virtual machine or the third virtual machine based on registered request. Consequently, the position information data may be efficiently shared.

Meanwhile, the first virtual machine in the processor may further execute an input and output server interface for data communication with the second virtual machine or the third virtual machine, which is a guest virtual machine, and in response to a request for transmission of the same position information data from the second virtual machine and the third virtual machine, the position information manager may transmit first position information data to the input and output server interface. Consequently, the position information data may be efficiently shared.

Meanwhile, the input and output server interface may write the first position information data in a shared memory based on the hypervisor, and the second virtual machine and the third virtual machine may receive the first position information data through the shared memory. Consequently, the position information data may be efficiently shared.

Meanwhile, the position information manager may selectively parse the position information data, and may selectively transmit the parsed position information data or unparsed position information data to the second virtual machine or the third virtual machine. Consequently, the position information data may be efficiently transmitted.

Meanwhile, the first virtual machine in the processor may further execute an input interface to receive input data from an external input device and an input manager to, in response to the received input data being touch input data corresponding to the second virtual machine or the third virtual machine, control transmission of the touch input data to the second virtual machine or the third virtual machine. Consequently, the touch input data may be efficiently shared.

Meanwhile, the first virtual machine in the processor may further execute an input and output server interface for data communication with the second virtual machine or the third virtual machine, which is a guest virtual machine, and in response to the input data being touch input data corresponding to the second virtual machine or the third virtual machine, the input manager may transmit the touch input data to the input and output server interface. Consequently, the touch input data may be efficiently shared.

Meanwhile, the input and output server interface may write the touch input data in a shared memory based on the hypervisor, and the second virtual machine or the third virtual machine may receive the touch input data through the shared memory. Consequently, the touch input data may be efficiently shared.

Meanwhile, the first virtual machine in the processor may further execute a sensor interface to receive sensor data from an external sensor device or microcomputer and a sensor manager to register a request for transmission of sensor data from the second virtual machine or the third virtual machine and to transmit the sensor data to the second virtual machine or the third virtual machine based on registered request. Consequently, the sensor data may be efficiently shared.

Meanwhile, the first virtual machine in the processor may further execute an input and output server interface for data communication with the second virtual machine or the third virtual machine, which is a guest virtual machine, and in response to a request for transmission of the same sensor data from the second virtual machine and the third virtual machine, the sensor manager may transmit first sensor data to the input and output server interface. Consequently, the sensor data may be efficiently shared.

Meanwhile, the input and output server interface may write the first sensor data in a shared memory based on the hypervisor, and the second virtual machine and the third virtual machine may receive the first sensor data through the shared memory. Consequently, the sensor data may be efficiently shared.

Meanwhile, the first virtual machine may receive and process wheel speed sensor data of the vehicle, and may transmit an overlay indicating the processed wheel speed sensor data or speed information corresponding to the processed wheel speed sensor data to at least one of the second virtual machine or the third virtual machine. Consequently, the wheel speed sensor data may be efficiently shared.

Meanwhile, the first virtual machine in the processor may further execute an audio interface to receive audio data from an external audio device and an audio manager to register a request for transmission of audio data from the second virtual machine or the third virtual machine and to transmit the audio data to the second virtual machine or the third virtual machine based on registered request. Consequently, the audio data may be efficiently shared.

Meanwhile, the first virtual machine in the processor may further execute an input and output server interface for data communication with the second virtual machine or the third virtual machine, which is a guest virtual machine, in response to a request for transmission of the same audio data from the second virtual machine and the third virtual machine, the audio manager may transmit first audio data to the input and output server interface, the input and output server interface may write the first audio data in a shared memory based on the hypervisor, and the second virtual machine and the third virtual machine may receive the first audio data through the shared memory. Consequently, the audio data may be efficiently shared.

Meanwhile, in response to the audio data being transmitted to the second virtual machine or the third virtual machine, the audio manager may perform control such that volume is adjusted or audio is played for each of the second virtual machine and the third virtual machine. Consequently, the audio data may be efficiently managed.

A signal processing device according to another embodiment of the present disclosure includes a processor configured to perform signal processing for a display located in a vehicle, wherein the processor is configured to execute first to third virtual machines on a hypervisor in the processor, the second virtual machine is operated for a first display, the third virtual machine is operated for a second display, and the first virtual machine in the processor is configured to execute a camera manager to transmit camera data to the second virtual machine or the third virtual machine, a position information manager to transmit position information data to the second virtual machine or the third virtual machine, an input manager to transmit touch input data to the second virtual machine or the third virtual machine, a sensor manager to transmit sensor data to the second virtual machine or the third virtual machine, and an audio manager to transmit audio data to the second virtual machine or the third virtual machine. Consequently, various kinds of external data may be efficiently shared.

A display apparatus for vehicles according to an embodiment of the present disclosure includes a first display, a second display, and a signal processing device including a processor configured to perform signal processing for the first display and the second display, wherein the processor is configured to execute first to third virtual machines on a hypervisor in the processor, the second virtual machine is operated for a first display, the third virtual machine is operated for a second display, and the first virtual machine in the processor is configured to execute a camera interface to receive camera data from an external camera device and a camera manager to register a request for transmission of camera data from the second virtual machine or the third virtual machine and to transmit the camera data to the second virtual machine or the third virtual machine based on registered request. Consequently, data received from the outside may be efficiently shared. In particular, camera data received from the outside may be efficiently shared. In addition, the camera data received from the outside may be efficiently shared even though the number of virtual machines that are driven is increased.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1A:
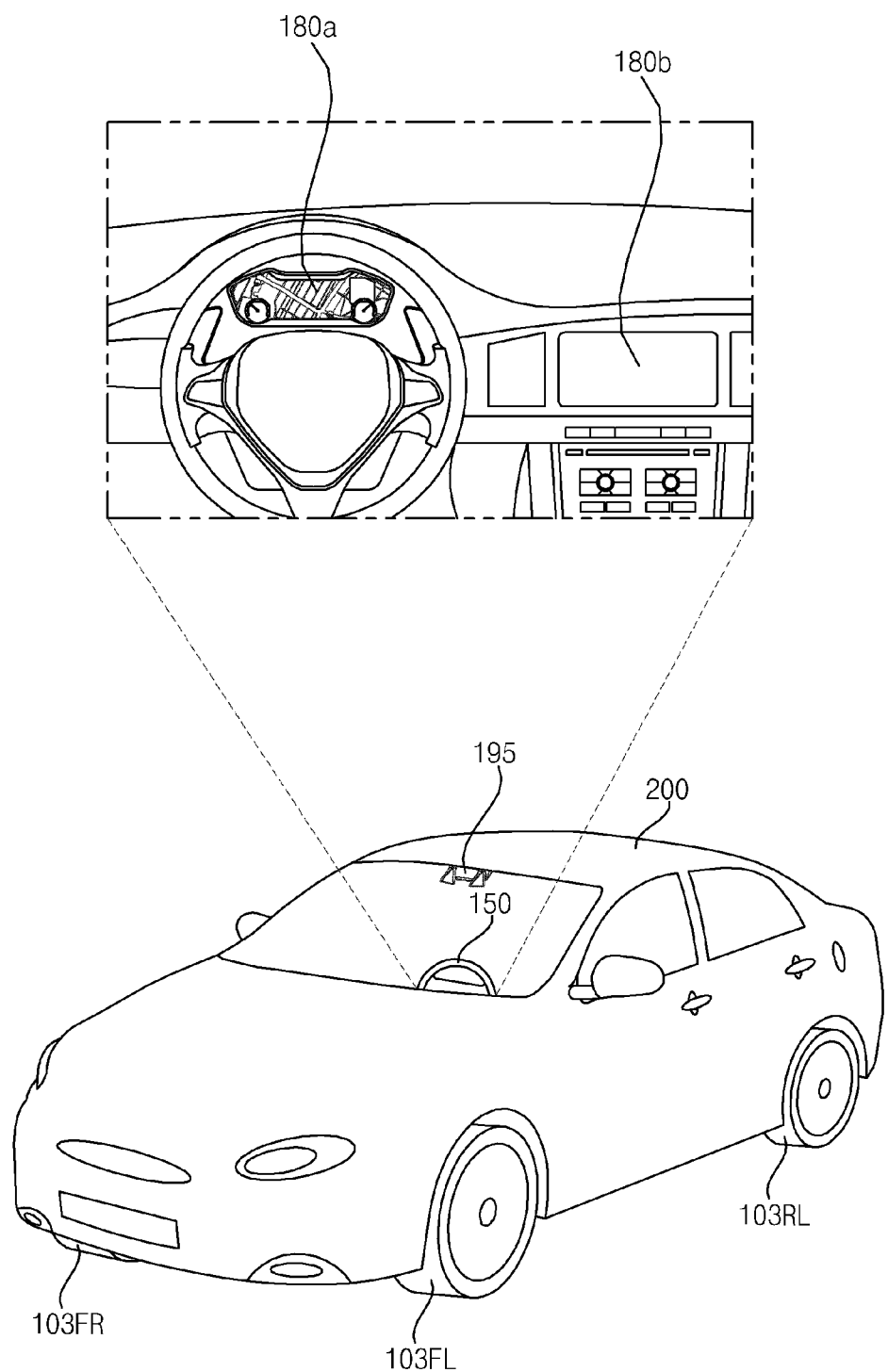
FIG. 1A is a view showing an example of the exterior and interior of a vehicle.

FIG. 1A is a view showing an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1A, a cluster display 180a and an audio video navigation (AVN) display 180b are illustrated as the plurality of displays 180a and 180b. In addition, a head up display (HUD) may also be used.

Meanwhile, the audio video navigation (AVN) display 180b may also be called a center information display.

The embodiment of the present disclosure proposes a scheme for a display apparatus 100 for vehicles including a plurality of displays 180a and 180b to divide data processing. This will be described with reference to FIG. 12 and subsequent figures.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 1B:
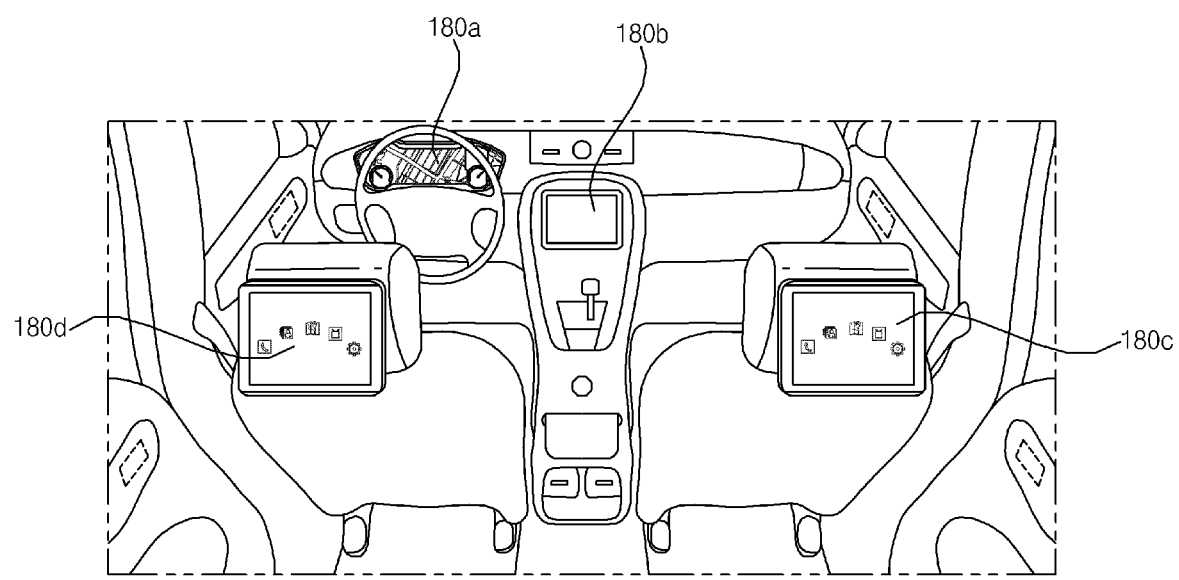
FIG. 1B is a view showing another example of the interior of the vehicle.

FIG. 1B is a view showing another example of the interior of the vehicle.

Referring to the figure, a cluster display 180a, an audio video navigation (AVN) display 180b, rear seat entertainment displays 180c and 180d, and a rear-view mirror display (not shown) may be located in the vehicle.

The embodiment of the present disclosure proposes a scheme for a display apparatus 100 for vehicles including a plurality of displays 180a to 180d to efficiently share data received from the outside. This will be described with reference to FIG. 5 and subsequent figures.

Figure 2:
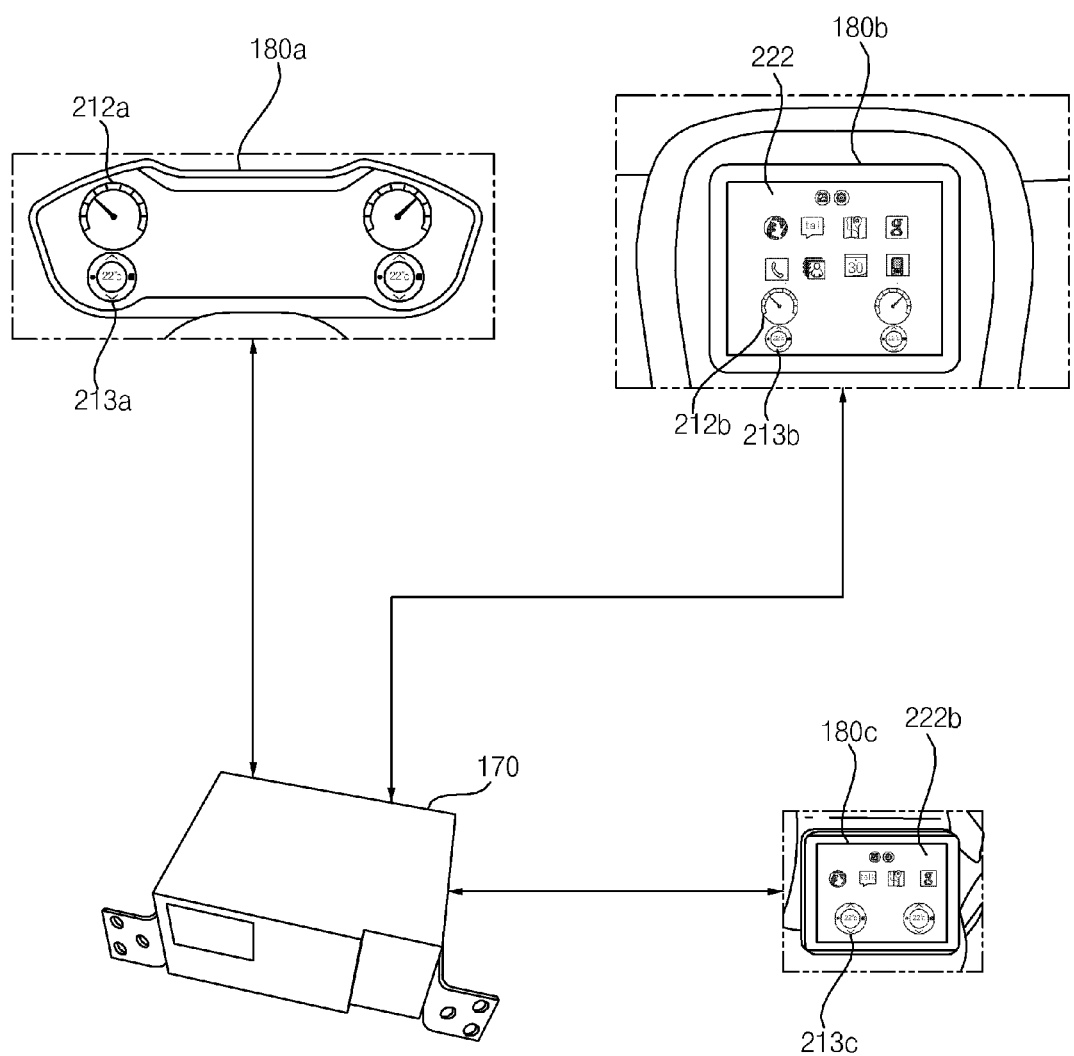
FIG. 2 is a view showing the external appearance of a display apparatus for vehicles according to an embodiment of the present disclosure.

FIG. 2 is a view showing the external appearance of a display apparatus for vehicles according to an embodiment of the present disclosure.

The display apparatus 100 for vehicles according to the embodiment of the present disclosure may include a plurality of displays 180a and 180b and a signal processing device 170 configured to perform signal processing in order to display images and information on the plurality of displays 180a and 180b.

The first display 180a, which is one of the plurality of displays 180a and 180b, may be a cluster display 180a configured to display a driving state and operation information, and the second display 180b may be an audio video navigation (AVN) display 180b configured to display vehicle driving information, a navigation map, various kinds of entertainment information, or an image.

The signal processing device 170 may have a processor 175 provided therein, and first to third virtual machines 520 to 540 may be executed by a hypervisor 505 in the processor 175.

The second virtual machine 530 may be operated for the first display 180a, and the third virtual machine 540 may be operated for the second display 180b.

Meanwhile, the first virtual machine 520 in the processor 175 may perform control such that a shared memory 508 based on the hypervisor 505 is set for transmission of the same data to the second virtual machine 530 and the third virtual machine 540. Consequently, the first display 180a and the second display 180b in the vehicle may display the same information or the same images in a synchronized state.

Meanwhile, the first virtual machine 520 in the processor 175 shares at least some of data with the second virtual machine 530 and the third virtual machine 540 for divided processing of data. Consequently, the plurality of virtual machines for the plurality of displays in the vehicle may divide and process data.

Meanwhile, the first virtual machine 520 in the processor 175 may receive and process wheel speed sensor data of the vehicle, and may transmit the processed wheel speed sensor data to at least one of the second virtual machine 530 or the third virtual machine 540. Consequently, at least one virtual machine may share the wheel speed sensor data of the vehicle.

Meanwhile, the display apparatus 100 for vehicles according to the embodiment of the present disclosure may further include a rear seat entertainment (RSE) display 180c configured to display driving state information, simple navigation information, various kinds of entertainment information, or an image.

The signal processing device 170 may further execute a fourth virtual machine (not shown), in addition to the first to third virtual machines 520 to 540, on the hypervisor 505 in the processor 175 to control the RSE display 180c.

Consequently, it is possible to control various displays 180a to 180c using a single signal processing device 170.

Meanwhile, some of the plurality of displays 180a to 180c may be operated based on a Linux Operating System (OS), and others may be operated based on a Web Operating System (OS).

When touch is input to any one of the displays 180a and 180b or 180a to 180c configured to be operated under various operating systems, the signal processing device 170 according to the embodiment of the present disclosure may perform control such that the touch input is rapidly and accurately processed.

Meanwhile, FIG. 2 illustrates that a vehicle speed indicator 212a and an in-vehicle temperature indicator 213a are displayed on the first display 180a, a home screen 222 including a plurality of applications, a vehicle speed indicator 212b, and an in-vehicle temperature indicator 213b is displayed on the second display 180b, and a home screen 222b including a plurality of applications and an in-vehicle temperature indicator 213c is displayed on the third display 180c.

Figure 3:
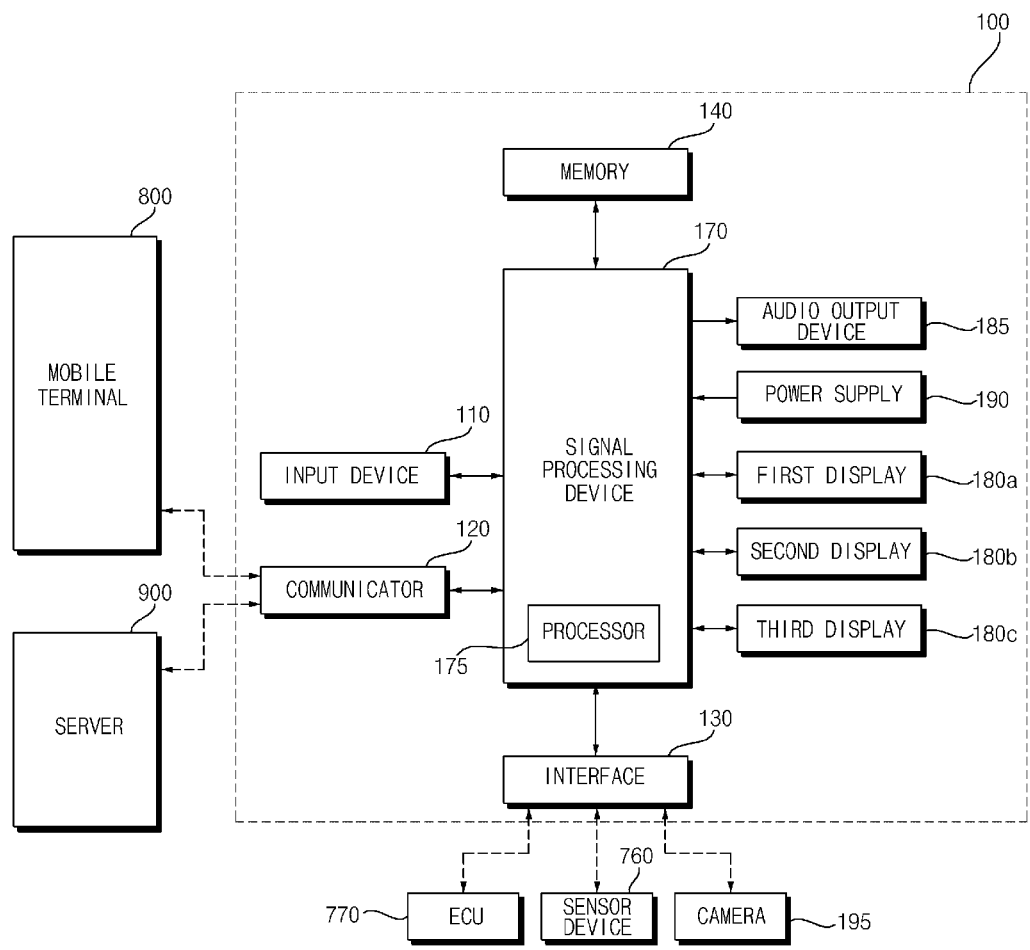
FIG. 3 illustrates an example of an internal block diagram of the display apparatus for vehicles of FIG. 2.

FIG. 3 illustrates an example of an internal block diagram of the display apparatus for vehicles according to the embodiment of the present disclosure.

Referring to the figure, the display apparatus 100 for vehicles according to the embodiment of the present disclosure may include an input device 110, a communicator 120, an interface 130, a memory 140, a signal processing device 170, a plurality of displays 180a to 180c, an audio output device 185, and a power supply 190.

The input device 110 may include a physical button or pad for button input or touch input.

Meanwhile, the input device 110 may include a touch sensor (not shown) configured to sense touch input to the displays 180a, 180b, and 180c.

Meanwhile, the input device 110 may include a microphone (not shown) for user voice input.

The communicator 120 may wirelessly exchange data with a mobile terminal 800 or a server 900.

In particular, the communicator 120 may wirelessly exchange data with a mobile terminal of a vehicle driver. Any of various data communication schemes, such as Bluetooth, Wi-Fi, WIFI Direct, and APIX, may be used as a wireless data communication scheme.

The communicator 120 may receive weather information and road traffic situation information, such as transport protocol expert group (TPEG) information, from the mobile terminal 800 or the server 900. To this end, the communicator 120 may include a mobile communication module (not shown).

The interface 130 may receive sensor information from an electronic control unit (ECU) 770 or a sensor device 760, and may transmit the received information to the signal processing device 170.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, and in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. Meanwhile, the position module may include a GPS module configured to receive GPS information.

Meanwhile, the interface 130 may receive front-of-vehicle image data, side-of-vehicle image data, rear-of-vehicle image data, and obstacle-around-vehicle distance information from a camera 195 or lidar (not shown), and may transmit the received information to the signal processing device 170.

The memory 140 may store various data necessary for overall operation of the display apparatus 100 for vehicles, such as programs for processing or control of the signal processing device 170.

For example, the memory 140 may store data about the hypervisor and first to third virtual machines executed by the hypervisor in the processor 175.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the display apparatus 100 for vehicles.

For example, the signal processing device 170 may include a processor 175 configured to perform signal processing for the displays 180a and 180b.

The processor 175 may execute the first to third virtual machines 520 to 540 on the hypervisor 505 (see FIG. 5) in the processor 175.

Figure 5:
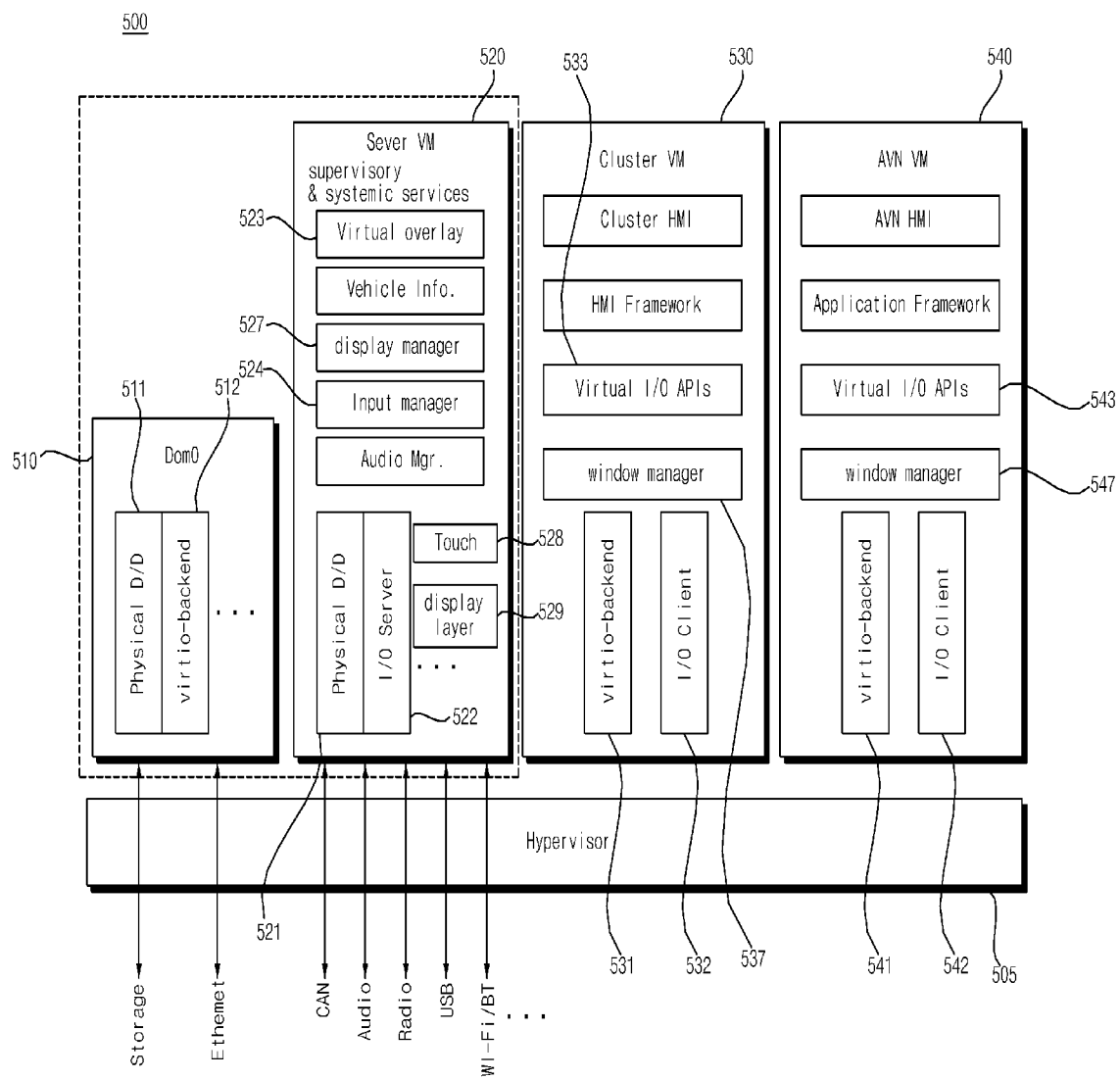
FIG. 5 is a view showing an example of a system driven in a signal processing device according to the present disclosure.

Meanwhile, the processor 175 may further execute a legacy virtual machine configured to receive and process Ethernet data. For example, as shown in FIG. 5, the legacy virtual machine 510 may be executed by the first virtual machine 520 in the processor 175.

Among the first to third virtual machines 520 to 540 (see FIG. 5), the first virtual machine 520 may be called a server virtual machine, and the second and third virtual machines 530 and 540 may be called guest virtual machines.

The second virtual machine 530 may be operated for the first display 180a, and the third virtual machine 540 may be operated for the second display 180b.

For example, the first virtual machine 520 in the processor 175 may receive, process, and output vehicle sensor data, position information data, camera image data, audio data, or touch input data. Data processed only by a legacy virtual machine and data processed by the first virtual machine 520 may be distinguished from each other, whereby data processing may be efficiently performed. In particular, the first virtual machine 520 may process most of the data, whereby 1:N data sharing may be achieved.

As another example, the first virtual machine 520 may directly receive and process CAN communication data, audio data, radio data, USB data, and wireless communication data for the second and third virtual machines 530 and 540.

The first virtual machine 520 may transmit the processed data to the second and third virtual machines 530 and 540.

Consequently, only the first virtual machine 520, among the first to third virtual machines 520 to 540, may receive communication data and external input data, and may perform signal processing, whereby load in signal processing by the other virtual machines may be reduced and 1:N data communication may be achieved, and therefore synchronization at the time of data sharing may be achieved.

Meanwhile, the first virtual machine 520 writes some of data in a first shared memory (not shown) so as to be transmitted to the second virtual machine 530, and writes some other of data in the first shared memory (not shown) so as to be transmitted to the third virtual machine 540. The second virtual machine 530 and the third virtual machine 540 may be configured to process the received data, and write the processed data in a second shared memory (not shown). Consequently, data received from the outside may be efficiently shared.

At this time, data may be any one of image data, audio data, navigation data, and voice recognition data.

Meanwhile, the first virtual machine 520 may process some other of data, and may be configured to write the processed data in the second shared memory (not shown). That is, the first virtual machine 520 may perform data processing in addition to the second virtual machine 530 and the third virtual machine 540.

Meanwhile, in response to a fourth virtual machine 550 configured to be operated for the third display 180c being executed in the processor 175, the first virtual machine 520 may write some other of data in the first shared memory (not shown), and the fourth virtual machine 550 may process the received data and may be configured to write the processed data in the second shared memory (not shown).

Meanwhile, the first virtual machine 520 may generate command queues for distributed processing of data in the second virtual machine 530 and the third virtual machine 540. Consequently, the plurality of virtual machines may divide and process data.

Meanwhile, in response to the second virtual machine 530 and the third virtual machine 540 sharing the same data, the first virtual machine 520 in the processor 175 may generate one command queue. Consequently, the same data may be synchronized and shared.

Meanwhile, the first virtual machine 520 may generate command queues corresponding to the number of virtual machines for distributed processing of data.

Meanwhile, the first virtual machine 520 may be configured to transmit at least some of data to at least one of the second virtual machine 530 or the third virtual machine 540 for distributed processing of data.

For example, the first virtual machine 520 may allocate the first shared memory (not shown) for transmitting at least some of data to at least one of the second virtual machine 530 or the third virtual machine 540, and image data processed by the second virtual machine 530 or the third virtual machine 540 may be written in the second shared memory (not shown).

Meanwhile, the first virtual machine 520 may be configured to write data in the shared memory 508, whereby the second virtual machine 530 and the third virtual machine 540 share the same data.

For example, the first virtual machine 520 may be configured to write radio data or wireless communication data in the shared memory 508, whereby the second virtual machine 530 and the third virtual machine 540 share the same data. Consequently, 1:N data sharing may be achieved.

Eventually, the first virtual machine 520 may process most of the data, whereby 1:N data sharing may be achieved.

Meanwhile, the first virtual machine 520 in the processor 175 may be configured to set the shared memory 508 based on the hypervisor 505 in order to transmit the same data to the second virtual machine 530 and the third virtual machine 540.

That is, the first virtual machine 520 in the processor 175 may transmit the same data to the second virtual machine 530 and the third virtual machine 540 in a synchronized state using the shared memory 508 based on the hypervisor 505. Consequently, the plurality of displays 180a and 180b in the vehicle may display the same images in a synchronized state.

Meanwhile, the signal processing device 170 may process various signals, such as an audio signal, an image signal, and a data signal. To this end, the signal processing device 170 may be implemented in the form of a system on chip (SOC).

Figure 4:
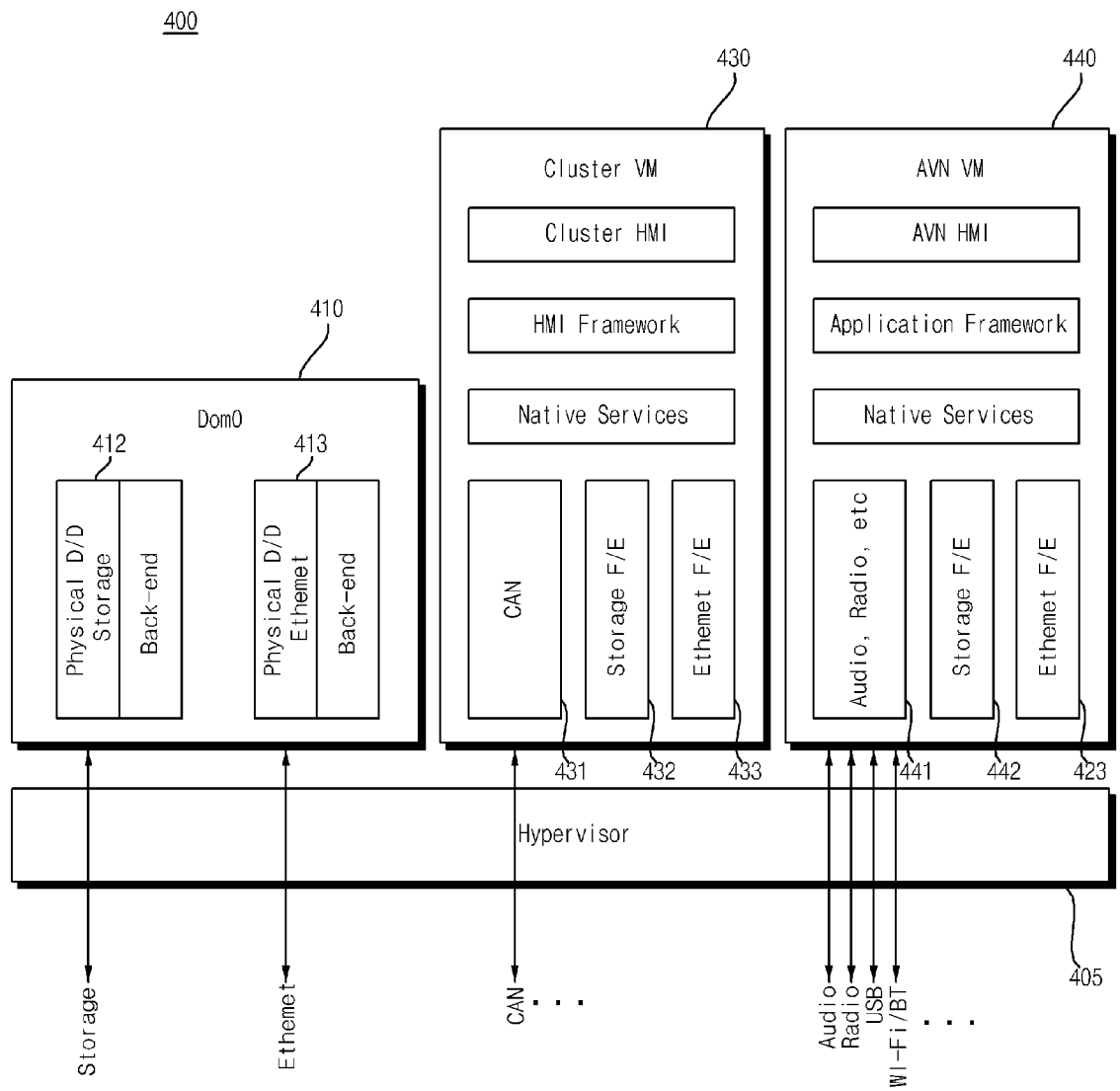
FIG. 4 is a view showing a system driven in a signal processing device related to the present disclosure.

FIG. 4 is a view showing a system driven in a signal processing device related to the present disclosure.

Referring to the figure, FIG. 4 is a view illustrating that virtual machines are used for the cluster display 180a and the AVN display 180b.

The system 400 driven in the signal processing device of FIG. 4 illustrates that a cluster virtual machine 430 and an AVN virtual machine 440 are executed through a hypervisor 405 in the processor 175.

Meanwhile, the system 400 driven in the signal processing device of FIG. 4 illustrates that a legacy virtual machine 410 is also executed on the hypervisor 405 in the processor 175.

The legacy virtual machine 410 may include an interface 412 for data communication with the memory 140 and an interface 413 for Ethernet communication.

Meanwhile, the cluster virtual machine 430 may include an interface 431 for CAN communication, an interface 432 for communication with the interface 412 of the legacy virtual machine 410, and an interface 433 for communication with the interface 413 of the legacy virtual machine 410.

Meanwhile, the AVN virtual machine 440 may include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there is a disadvantage in that CAN communication data are input and output only in the cluster virtual machine 430, whereby the CAN communication data cannot be utilized in the AVN virtual machine 440.

Also, in the system 400 of FIG. 4, there is a disadvantage in that audio data, radio data, USB data, and wireless communication data are input and output only in the AVN virtual machine 440, whereby these data cannot be utilized in the cluster virtual machine 430.

Meanwhile, there is a disadvantage in that the cluster virtual machine 430 and the AVN virtual machine 440 must include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. That is, unlike FIG. 4, virtual machines are classified into a server virtual machine and guest virtual machines for inputting and outputting various memory data and communication data not in the guest virtual machines but in the server virtual machine. This will be described with reference to FIG. 5 and subsequent figures.

FIG. 5 is a view showing an example of a system driven in a signal processing device according to the present disclosure.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, are executed on the hypervisor 505 in the processor 175 of the signal processing device 170.

The second virtual machine 530 may be a virtual machine for the cluster display 180a, and the third virtual machine 540 may be a virtual machine for the AVN display 180b.

That is, the second virtual machine 530 and the third virtual machine 540 may be operated for image rendering of the cluster display 180a and the AVN display 180b, respectively.

Meanwhile, the system 50 driven in the signal processing device 170 of FIG. 5 illustrates that a legacy virtual machine 510 is also executed on the hypervisor 505 in the processor 175.

The legacy virtual machine 510 may include an interface 511 for data communication with the memory 140 and Ethernet communication.

The figure illustrates that the interface 511 is a physical device driver; however, various modifications are possible.

Meanwhile, the legacy virtual machine 510 may further include a virtio-backend interface 512 for data communication with the second and third virtual machines 530 and 540.

The first virtual machine 520 may include an interface 521 for input and output of audio data, radio data, USB data, and wireless communication data and an input and output server interface 522 for data communication with the guest virtual machines.

That is, the first virtual machine 520, which is a server virtual machine, may provide inputs/outputs (I/O) difficult to virtualize with standard virtualization technology (VirtIO) to a plurality of guest virtual machines, such as the second and third virtual machines 530 and 540.

Meanwhile, the first virtual machine 520, which is a server virtual machine, may control radio data and audio data at a supervisor level, and may provide the data to a plurality of guest virtual machines, such as the second and third virtual machines 530 and 540.

Meanwhile, the first virtual machine 520, which is a server virtual machine, may process vehicle data, sensor data, and surroundings-of-vehicle information, and may provide the processed data or information to a plurality of guest virtual machines, such as the second and third virtual machines 530 and 540.

Meanwhile, the first virtual machine 520 may provide supervisory services, such as processing of vehicle data and audio routing management.

Next, the second virtual machine 530 may include an input and output client interface 532 for data communication with the first virtual machine 520 and APIs 533 configured to control the input and output client interface 532.

In addition, the second virtual machine 530 may include a virtio-backend interface for data communication with the legacy virtual machine 510.

The second virtual machine 530 may receive memory data by communication with the memory 140 or Ethernet data by Ethernet communication from the virtio-backend interface 512 of the legacy virtual machine 510 through the virtio-backend interface.

Next, the third virtual machine 540 may include an input and output client interface 542 for data communication with the first virtual machine 520 and APIs 543 configured to control the input and output client interface 542.

In addition, the third virtual machine 540 may include a virtio-backend interface for data communication with the legacy virtual machine 510.

The third virtual machine 540 may receive memory data by communication with the memory 140 or Ethernet data by Ethernet communication from the virtio-backend interface 512 of the legacy virtual machine 510 through the virtio-backend interface.

Meanwhile, the legacy virtual machine 510 may be provided in the first virtual machine 520, unlike FIG. 5.

In the system 500, CAN communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Also, in the system 500 of FIG. 5, audio data, radio data, USB data, and wireless communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Also, in the system 500 of FIG. 5, touch input to the first display 180a or the second display 180b is input only to the first virtual machine 520 and is not input to the second virtual machine 530 and the third virtual machine 540. Information regarding the touch input is transmitted to the second virtual machine 530 or the third virtual machine 540.

Consequently, the touch input may be rapidly and accurately processed. In addition, the touch input may be rapidly and accurately processed even though the number of virtual machines that are driven is increased.

Meanwhile, in the system 500 of FIG. 5, the second and third virtual machines 530 and 540 may be operated based on different operating systems.

For example, the second virtual machine 530 may be operated based on a Linux OS, and the third virtual machine 540 may be operated based on a Web OS.

In the first virtual machine 520, the shared memory 508 based on the hypervisor 505 is set for data sharing, even though the second and third virtual machines 530 and 540 are operated based on different operating systems. Even though the second and third virtual machines 530 and 540 are operated based on different operating systems, therefore, the same data or the same images may be shared in a synchronized state. Eventually, the plurality of displays 180a and 180b may display the same data or the same images in a synchronized state.

Meanwhile, the first virtual machine 520 transmits information regarding the touch input to the second virtual machine 530 or the third virtual machine 540 even though the second and third virtual machines 530 and 540 are operated based on different operating systems. Consequently, the touch input may be rapidly and accurately processed even though the second and third virtual machines 530 and 540 are operated based on different operating systems (OS).

Meanwhile, the first virtual machine 520 may include a display manager 527 configured to control overlays displayed on the first display 180a and the second display 180b through the second and third virtual machines 530 and 540, a display layer server 529, and a virtual overlay generator 523 configured to generate a virtual overlay.

The display layer server 529 may receive a first overlay provided by the second virtual machine 530 and a second overlay provided by the third virtual machine 540.

Meanwhile, the display layer server 529 may transmit a virtual overlay generated by the virtual overlay generator 523 to at least one of the second virtual machine 530 or the third virtual machine 540.

Meanwhile, the display manager 527 in the first virtual machine 520 may receive the first overlay provided by the second virtual machine 530 and the second overlay provided by the third virtual machine 540 through the display layer server 529.

The display manager 527 in the first virtual machine 520 may be configured to transmit the virtual overlay, which is different from the first overlay or the second overlay, to at least one of the second virtual machine 530 or the third virtual machine 540 through the display layer server 529.

In response thereto, the second virtual machine 530 may perform control such that the first overlay and the virtual overlay are combined and displayed on the first display 180a.

In addition, the third virtual machine 540 may perform control such that the second overlay and the virtual overlay are combined and displayed on the second display 180b.

Meanwhile, the first virtual machine 520 may include an input manager 524 configured to receive an input signal from the outside. At this time, the input signal may be an input signal from a predetermined button (start button) in the vehicle, a touch input signal, or a voice input signal.

For example, the input manager 524 in the first virtual machine 520 may receive touch input from the first display 180a or the second display 180b.

Meanwhile, the first virtual machine 520 may include a touch server 528 configured to transmit information regarding the touch input related to the touch input from the first display 180a or the second display 180b to the second virtual machine 530 or the third virtual machine 540.

For example, in response to touch input corresponding to the first display 180a, the touch server 528 in the first virtual machine 520 may transmit information regarding the touch input to the second virtual machine 530.

Meanwhile, the touch server 528 in the first virtual machine 520 may receive the touch input from the first display 180a or the second display 180b.

Figure 6:
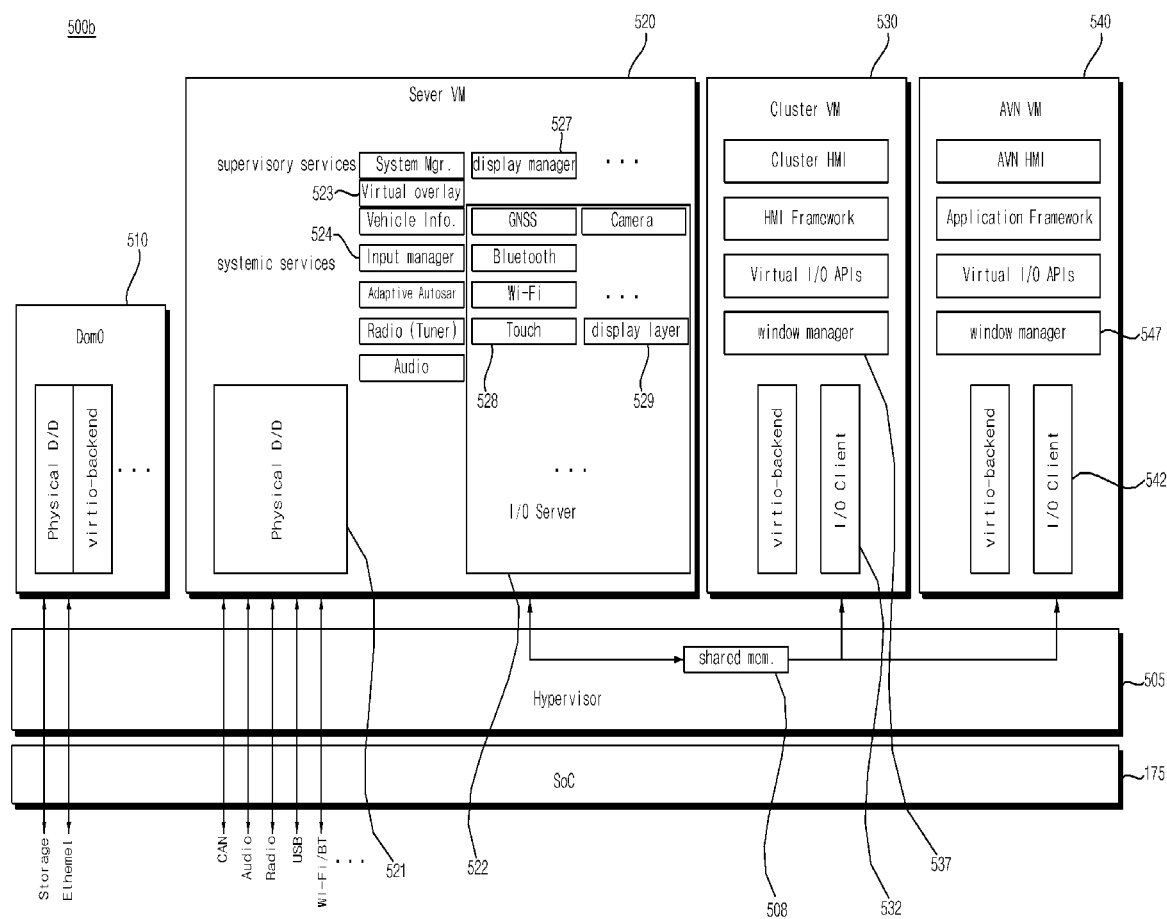
FIG. 6 is a view showing another example of the system driven in the signal processing device according to the present disclosure.

FIG. 6 is a view showing another example of the system driven in the signal processing device according to the present disclosure.

Referring to the figure, in the system 500b driven by the processor 175 in the signal processing device 170, the processor 175 in the signal processing device 170 executes the first to third virtual machines 520 to 540 on the hypervisor 505 in the processor 175, and the first virtual machine 520 in the processor 175 is configured to set the shared memory 508 based on the hypervisor 505 for transmission of data to the second and third virtual machines 530 and 540.

For example, information regarding touch input may be illustrated as the data. Consequently, the information regarding touch input may be transmitted to the second virtual machine 530 or the third virtual machine 540. Eventually, the touch input to the first display 180a or the second display 180b may be rapidly and accurately processed. In addition, the touch input may be rapidly and accurately processed even though the number of virtual machines that are driven is increased.

As another example, image data may be illustrated as the data. Consequently, an image may be displayed on the first display 180a or the second display 180b.

Meanwhile, in response to the same image data being shared in the shared memory 508, the plurality of displays 180a and 180b in the vehicle may display the same data in a synchronized state.

As another example, CAN communication data, audio data, radio data, USB data, wireless communication data, or position information data may be illustrated as the data. Consequently, information regarding the data may be displayed on the first display 180a or the second display 180b.

Meanwhile, although not shown in FIG. 6, the legacy virtual machine 510 may transmit memory data from the memory 140 or Ethernet data by Ethernet communication to the second and third virtual machines 530 and 540 using the shared memory 508 based on the hypervisor 505. Consequently, information corresponding to the memory data or the Ethernet data may be displayed on the first display 180a or the second display 180b.

Meanwhile, the first virtual machine 520 in the system 500b of FIG. 6 may include a display manager 527, a display layer server 529, a virtual overlay generator 523, an input manager 524, and a touch server 528, similarly to the first virtual machine 520 in the system 500 of FIG. 5.

Meanwhile, the input and output server interface 522 in the first virtual machine 520 in the system 500b of FIG. 6 may include a display layer server 529 and a touch server 528, unlike FIG. 5.

The operation of the display manager 527, the display layer server 529, the input manager 524, the virtual overlay generator 523, and the touch server 528 is the same to FIG. 5, and therefore a description thereof will be omitted.

Meanwhile, the first virtual machine 520 of FIG. 6 may further include a system manager for overall system control, a vehicle information manager for vehicle information management, an audio manager for audio control, and a radio manager for radio control.

Meanwhile, the input and output server interface 522 in the first virtual machine 520 in the system 500b of FIG. 6 may further include a GNSS server for GPS information input and output, a Bluetooth server for Bluetooth input and output, a Wi-Fi server for Wi-Fi input and output, and a camera server for camera data input and output.

Figure 7:
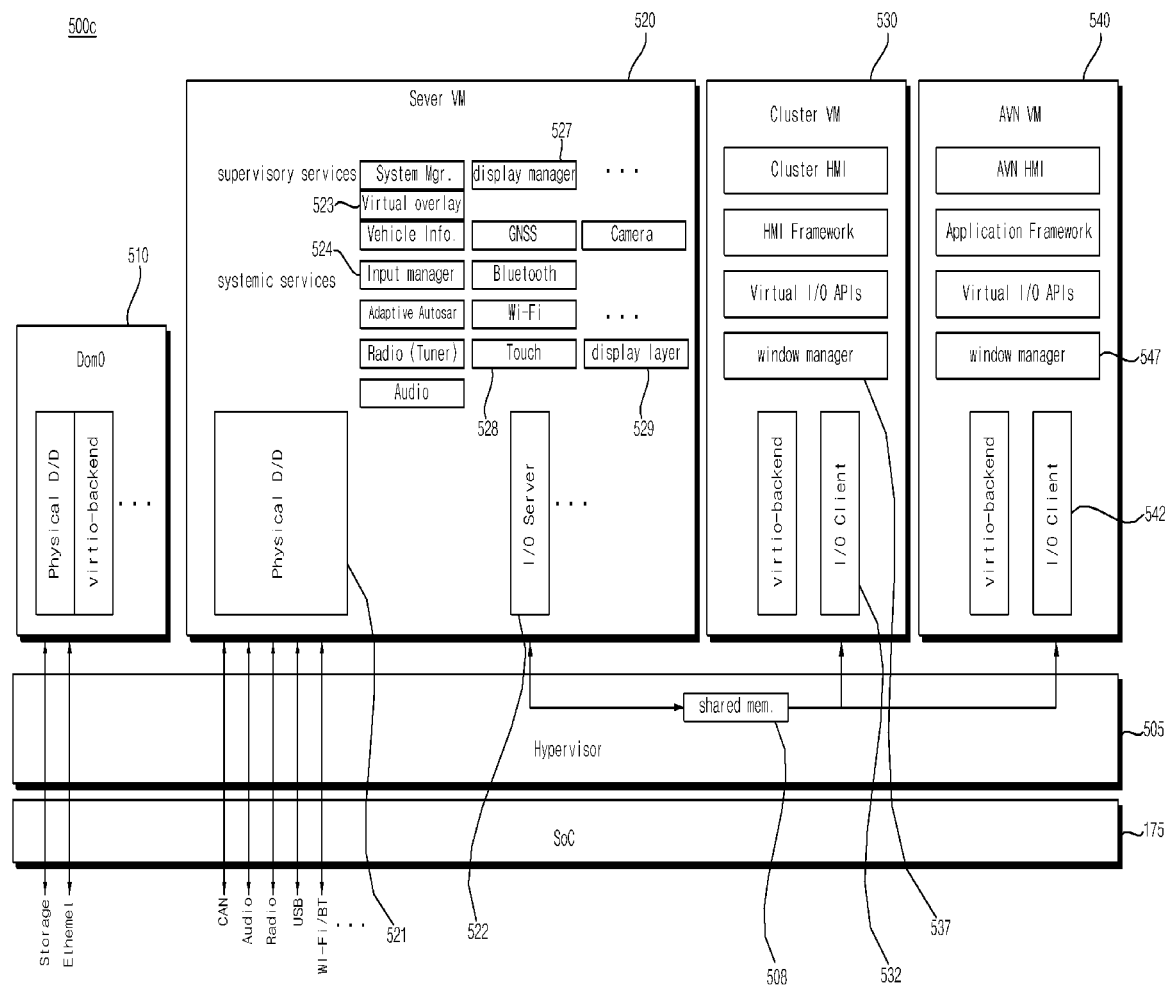
FIG. 7 is a view showing a further example of the system driven in the signal processing device according to the present disclosure.

FIG. 7 is a view showing a further example of the system driven in the signal processing device according to the present disclosure.

Referring to the figure, the system 500c driven by the processor 175 in the signal processing device of FIG. 7 is similar to the system 500b of FIG. 6.

That is, like FIG. 6, the processor 175 of FIG. 7 executes the first to third virtual machines 520 to 540 on the hypervisor 505 in the processor 175.

In FIG. 7, however, the display layer server 529 and the touch server 528 may be provided and executed in the first virtual machine 520 outside the input and output server interface 522, unlike FIG. 6.

In addition, the GNSS server for GPS information input and output, the Bluetooth server for Bluetooth input and output, the Wi-Fi server for Wi-Fi input and output, and the camera server for camera data input and output may be provided and executed in the first virtual machine 520 outside the input and output server interface 522, unlike FIG. 6.

That is, the display manager 527, the display layer server 529, the virtual overlay generator 523, the input manager 524, and the touch server 528 may be provided and executed in the first virtual machine 520.

The operation of the display manager 527, the display layer server 529, the virtual overlay generator 523, the input manager 524, and the touch server 528 is the same to FIG. 5, and therefore a description thereof will be omitted.

Figure 8:
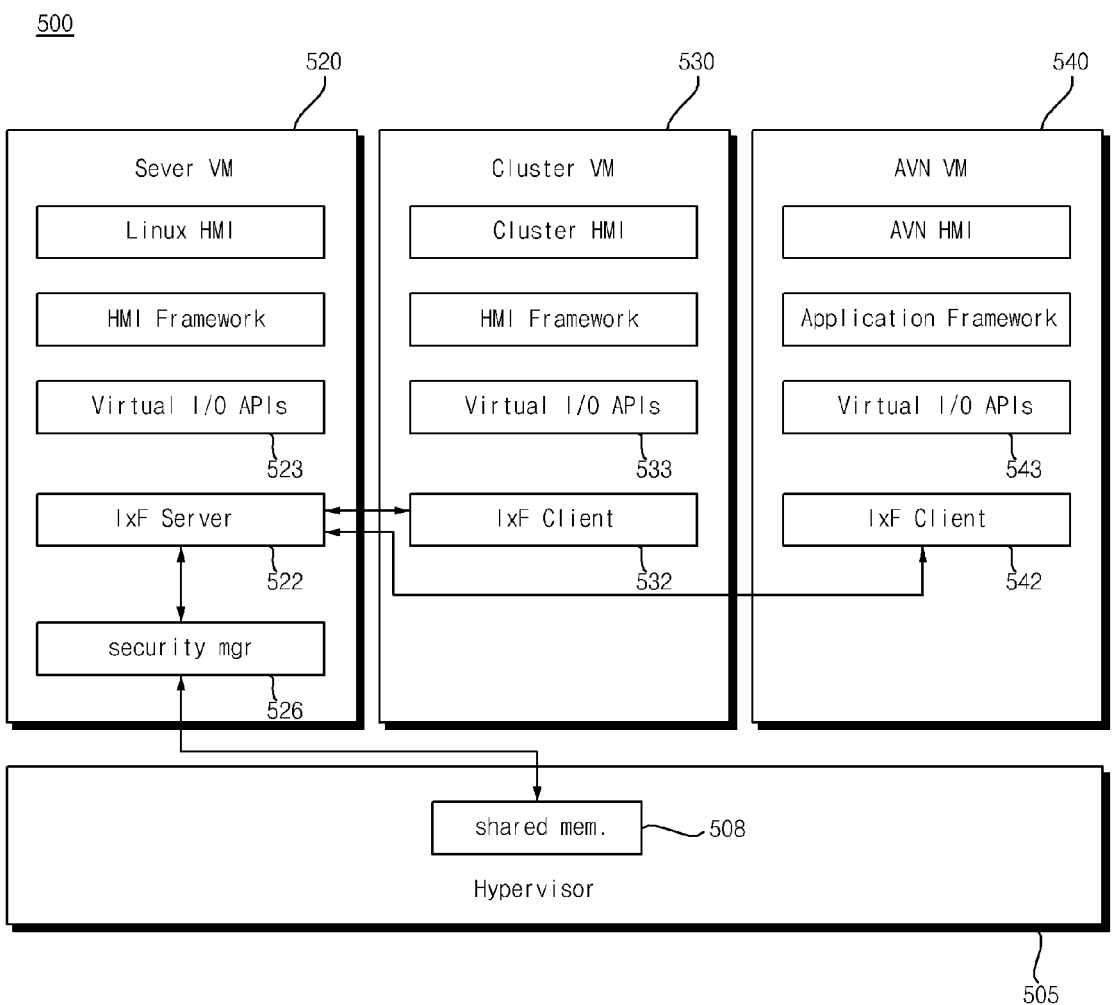
FIGS. 8 to 9B are views referred to in the description of FIG. 5.
Figure 9A:
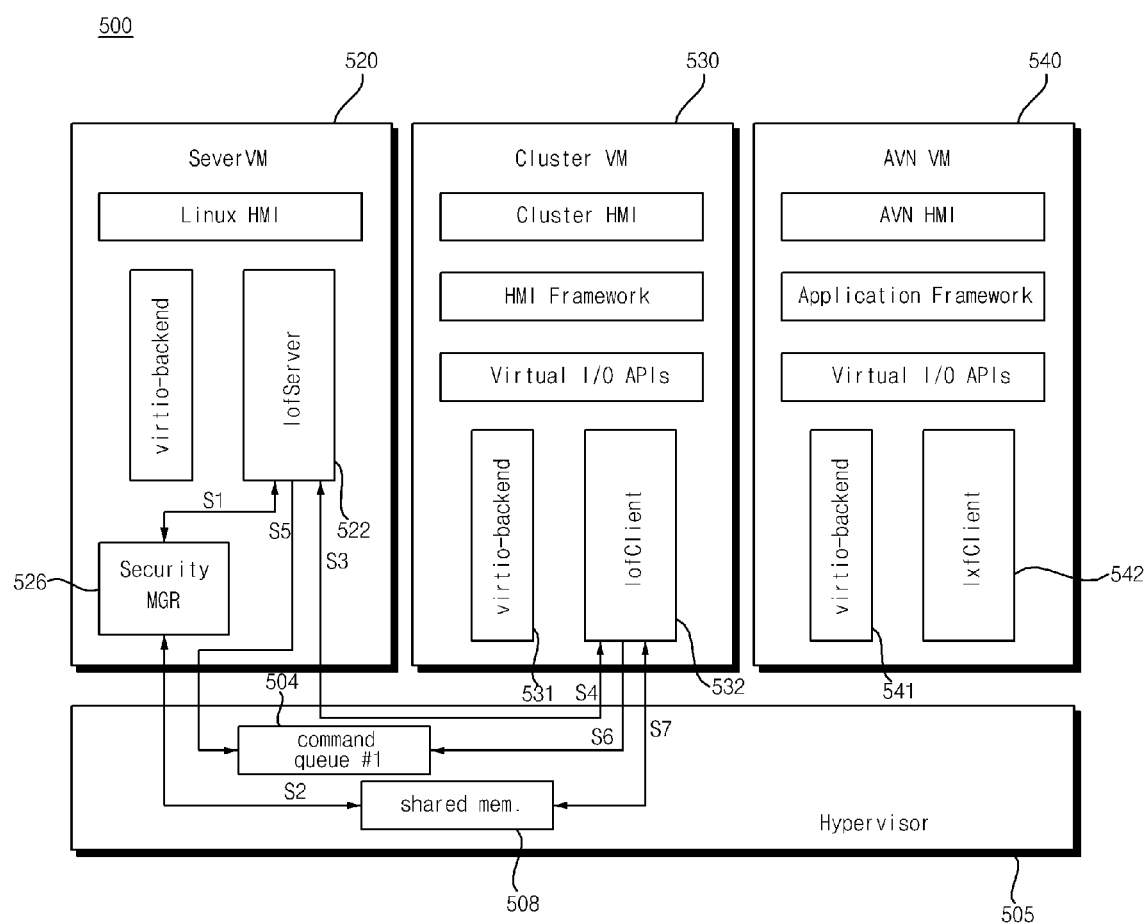
Figure 9B:
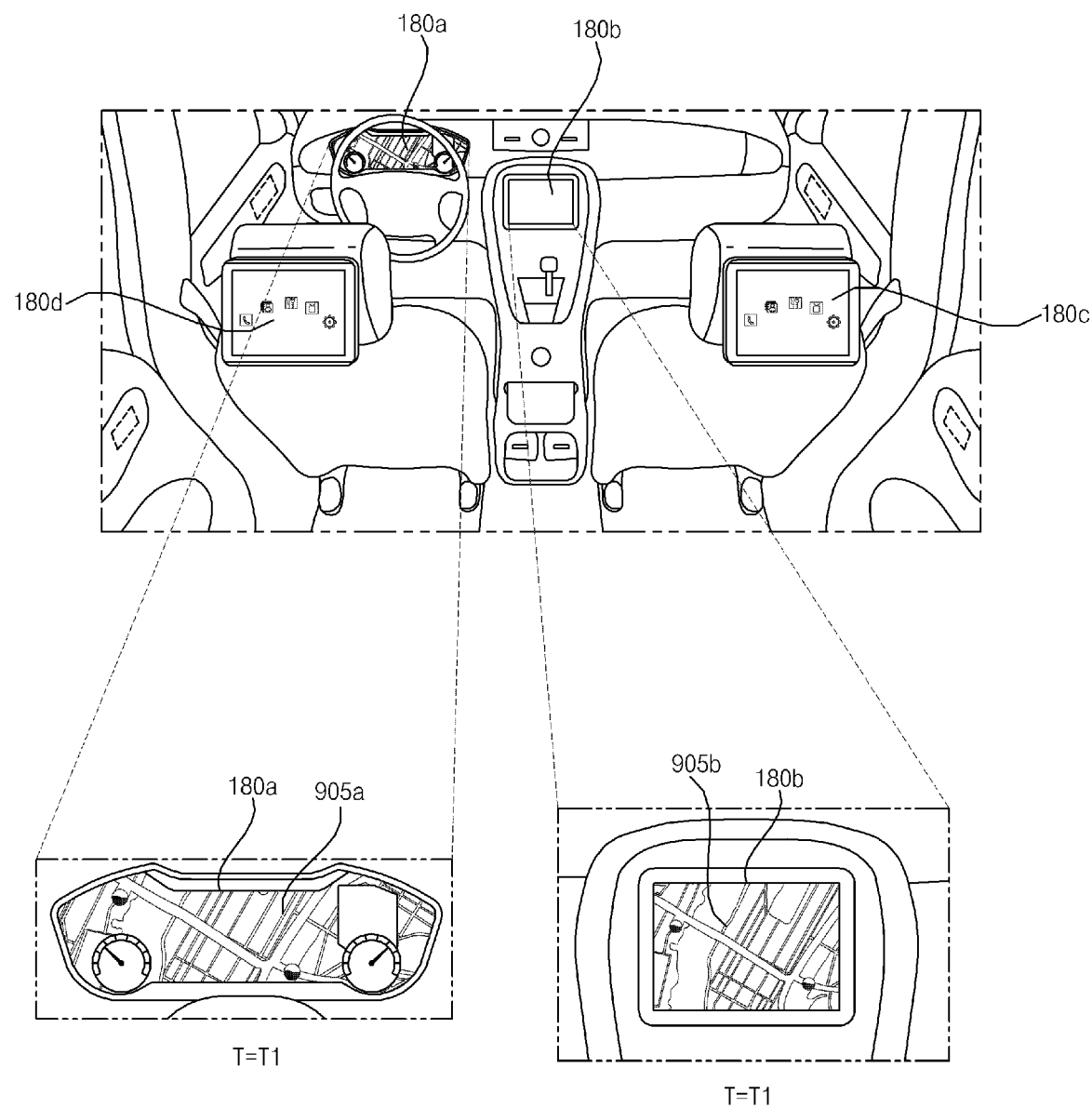

FIGS. 8 to 9B are views referred to in the description of FIG. 5.

First, FIG. 8 illustrates that the first to third virtual machines 520 to 540 are executed on the hypervisor 505 in the processor 175 of the system 500 according to the present disclosure and that the first virtual machine 520 in the processor 175 is configured to set the shared memory 508 based on the hypervisor 505 in order to transmit the same data to the second virtual machine 530 and the third virtual machine 540.

Consequently, the plurality of displays 180a and 180b in the vehicle may display the same images in a synchronized state.

Meanwhile, high-speed data communication may be performed between the plurality of virtual machines. Furthermore, high-speed data communication may be performed even though the plurality of virtual machines is driven by different operating systems.

Meanwhile, the first virtual machine 520 in the processor 175 may not allocate memories corresponding in number to the virtual machines but may use a single shared memory 508, not memory allocation in response to transmitting the data processed by the first virtual machine 520 to another virtual machine. Consequently, 1:N data communication using the shared memory 508, not 1:1 data communication, may be performed between the virtual machines.

Meanwhile, the first virtual machine 520 in the processor 175 may include an input and output server interface 522 and a security manager 526.

Meanwhile, the second virtual machine 530 and the third virtual machine 540 may include input and output client interfaces 532 and 542, respectively. Consequently, high-speed data communication between the plurality of virtual machines may be performed using the input and output server interface 522 and the input and output client interfaces 532 and 542.

The input and output server interface 522 in the first virtual machine 520 may receive requests for transmission of the same data from the input and output client interfaces 532 and 542 in the second virtual machine 530 and the third virtual machine 540, and may transmit shared data to the shared memory 508 through the security manager 526 based thereon.

FIG. 9A is a view illustrating transmission of shared data in more detail.

Referring to the figure, in order to transmit shared data, the input and output server interface 522 in the first virtual machine 520 transmits a request for allocation of the shared memory 508 to the security manager 526 (S1).

Subsequently, the security manager 526 may allocate the shared memory 508 using the hypervisor 505 (S2), and may write shared data in the shared memory 508.

Meanwhile, the input and output client interfaces 532 and 542 may transmit a request for connection to the input and output server interface 522 after allocation of the shared memory 508 (S3).

Meanwhile, the input and output server interface 522 transmits information regarding shared memory 508 including key data to the input and output client interfaces 532 and 542 after allocation of the shared memory 508 (S4). At this time, the key data may be private key data for data access.

Meanwhile, the first virtual machine 520 in the processor 175 may transmit information regarding the shared memory 508 to the second virtual machine 530 and the third virtual machine 540 after setting of the shared memory 508.

Subsequently, the input and output server interface 522 in the first virtual machine 520 is configured to generate a command or a command queue for event processing, other than data, to control distributed processing between the virtual machines (S5).

The figure illustrates that a command queue is generated in a command queue buffer 504 in the hypervisor 505 under control of the input and output server interface 522. However, the present disclosure is not limited thereto, and the command queue may be generated in the first virtual machine 520, not the hypervisor 505, under control of the input and output server interface 522.

Subsequently, the input and output client interfaces 532 and 542 access the command queue buffer 504 to receive the generated command queue or information regarding the command queue (S6).

For example, in response to the commands transmitted to the input and output client interfaces 532 and 542 being the same, the generated command queues may be the same.

As another example, in response to the commands transmitted to the input and output client interfaces 532 and 542 being different from each other, different command queues may be transmitted to the input and output client interfaces 532 and 542.

Subsequently, the input and output client interfaces 532 and 542 may access the shared memory 508 based on the received key data (S5), and may copy or read the shared data from the shared memory 508 (S7).

Particularly, in response to the input and output client interfaces 532 and 542 receiving the same shared data, the input and output client interfaces 532 and 542 may access the shared memory 508 based on the same command queues and the same key data (S5), and may copy or read the shared data from the shared memory 508.

Consequently, the second virtual machine 530 and the third virtual machine 540 may access the shared memory 508, and may eventually share the shared data.

For example, in the case in which the shared data are image data, the second virtual machine 530 and the third virtual machine 540 may share the image data, and eventually the plurality of displays 180*a* and 180*b* in the vehicle may display the same shared images in a synchronized state.

FIG. 9B illustrates that, by the system 500 of FIG. 9A, the second virtual machine 530 displays image data received through the shared memory 508 on the first display 180*a*, and the third virtual machine 540 displays image data received through the shared memory 508 on the second display 180*b*.

FIG. 9B illustrates that an image 905*a* displayed on the first display 180*a* and an image 905*b* displayed on the second display 180*b* are synchronized, whereby the same images 905*a* and 905*b* are displayed at the time of Ti.

That is, image data processed by the first virtual machine 520 in the processor 175 are transmitted to the second virtual machine 530 and the third virtual machine 540 through the shared memory 508, and the first image 905*a* displayed on the first display 180*a* and the second image 905*b* displayed on the second display 180*b* based on the image data may be the same. Consequently, the plurality of displays 180*a* and 180*b* in the vehicle may display the same images in a synchronized state.

Figure 10:
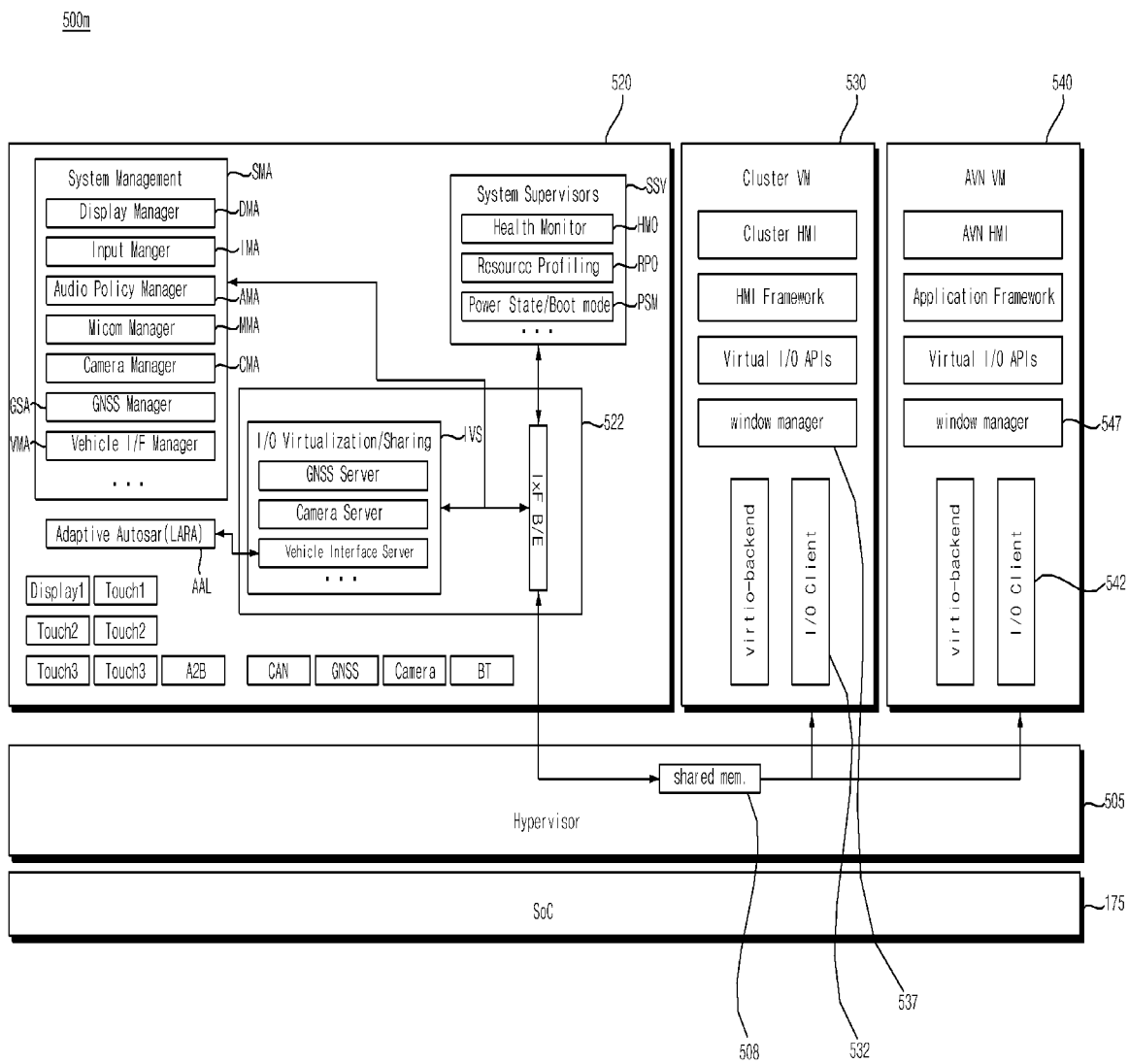
FIG. 10 is a view showing an example of a system driven in a signal processing device according to an embodiment of the present disclosure.

FIG. 10 is a view showing an example of a system driven in a signal processing device according to an embodiment of the present disclosure.

Referring to the figure, the system 500*m* driven in the signal processing device 170 according to the embodiment of the present disclosure executes first to third virtual machines 520 to 540 on a hypervisor 505 in a processor 175.

Meanwhile, the second virtual machine 530 is operated for the first display 180*a*, and the third virtual machine 540 is operated for the second display 180*b*.

Meanwhile, the first virtual machine 520 in the processor 175 executes a camera manager CMA configured to transmit camera data to the second virtual machine 530 or the third virtual machine 540, a position information manager GSA configured to transmit position information data to the second virtual machine 530 or the third virtual machine 540, an input manager IMA configured to transmit touch input data to the second virtual machine 530 or the third virtual machine 540, a sensor manager VMA configured to transmit sensor data to the second virtual machine 530 or the third virtual machine 540, and an audio manager AMA configured to transmit audio data to the second virtual machine 530 or the third virtual machine 540. Consequently, various kinds of external data may be efficiently shared.

For example, the first virtual machine 520 in the processor 175 may receive camera data from an external camera device, and the first virtual machine 520 may execute the camera manager CMA to transmit the camera data to the second virtual machine 530 or the third virtual machine 540.

As another example, the first virtual machine 520 in the processor 175 may receive position information data from an external GPS device, and the first virtual machine 520 may execute the position information manager GSA to transmit the position information data to the second virtual machine 530 or the third virtual machine 540.

As another example, the first virtual machine 520 in the processor 175 may receive touch input data, and the first virtual machine 520 may execute the input manager IMA to transmit the touch input data to the second virtual machine 530 or the third virtual machine 540.

As another example, the first virtual machine 520 in the processor 175 may receive sensor data from an external sensor device or microcomputer, and the first virtual machine 520 may execute the sensor manager VMA to transmit the sensor data to the second virtual machine 530 or the third virtual machine 540.

As a further example, the first virtual machine 520 in the processor 175 may receive audio data from an external network or an external audio device, and the first virtual machine 520 may execute the audio manager AMA to transmit the audio data to the second virtual machine 530 or the third virtual machine 540.

Meanwhile, the first virtual machine 520 in the processor 175 may further execute a display manager DMA configured to control an overlay displayed on the first display 180*a* or the second display 180*b*. At this time, the display manager DMA may correspond to the display manager 527 of FIG. 5.

Meanwhile, the first virtual machine 520 in the processor 175 may further execute a microcomputer manager MMA configured to control a microcomputer in the vehicle.

Meanwhile, in the figure, the camera manager CMA, the position information manager GSA, the input manger IMA, the sensor manager VMA, the audio manager AMA, the display manager DMA, and the microcomputer manager MMA may be controlled by a system manager SMA.

That is, the first virtual machine 520 in the processor 175 may execute the system manager SMA, and the system manager SMA may selectively execute the camera manager CMA, the position information manager GSA, the input manger IMA, the sensor manager VMA, the audio manager AMA, the display manager DMA, and the microcomputer manager MMA.

Meanwhile, the first virtual machine 520 in the processor 175 may execute a system supervisor.

The system supervisor may execute a health monitor HMO for body information monitoring, a resource profile RPO for resource profiling, and power management PSM for a power state or a boot mode.

Meanwhile, the first virtual machine 520 in the processor 175 may execute AUTOSAR.

Meanwhile, the first virtual machine 520 in the processor 175 may execute an input and output server interface 522 for sharing of data with the second virtual machine 530 or the third virtual machine 540.

The figure illustrates that input and output virtualization IVS and an interface backend IFE are executed or provided in the input and output server interface 522. Unlike this, however, only the interface backend IFE may be executed or provided in the input and output server interface 522.

The interface backend IFE in the input and output server interface 522 may write data from the system manager SMA in a shared memory 508 based on the hypervisor 505.

The second virtual machine 530 or the third virtual machine 540 may read the data written in the shared memory 508. Consequently, the second virtual machine 530 or the third virtual machine 540, which is a guest virtual machine, may efficiently share data received from the outside.

Figure 11:
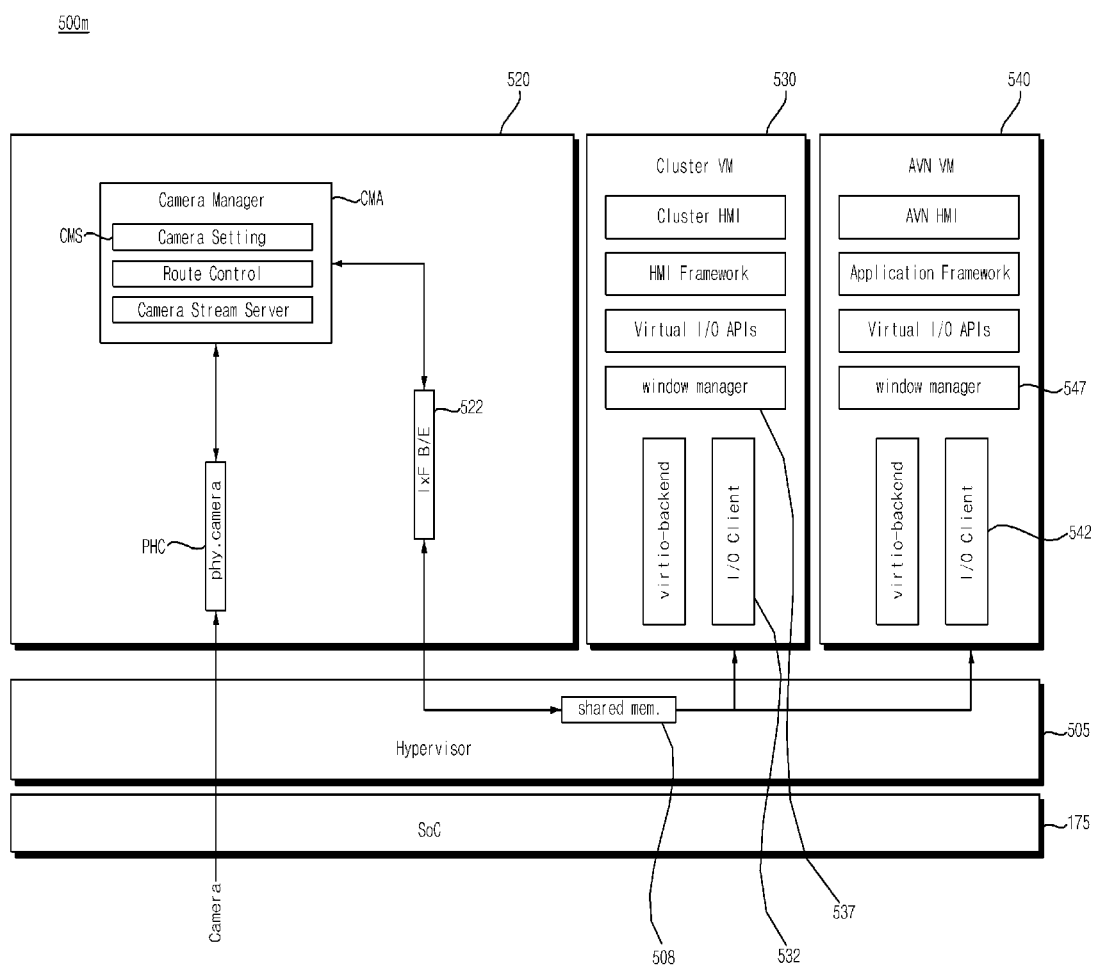
FIG. 11 is a view showing the case in which a camera manager is executed in the system driven in the signal processing device of FIG. 10.

FIG. 11 is a view showing the case in which the camera manager is executed in the system driven in the signal processing device of FIG. 10.

Referring to the figure, the system 500*m* driven in the signal processing device 170 according to the embodiment of the present disclosure executes the first to third virtual machines 520 to 540 on the hypervisor 505 in the processor 175.

Meanwhile, the second virtual machine 530 is operated for the first display 180*a*, and the third virtual machine 540 is operated for the second display 180*b*.

Meanwhile, the second virtual machine 530, which is a guest virtual machine, may execute a window manager 537 configured to control a window of an image in which an overlay will be generated or displayed and an input and output client interface 532 for data communication with the first virtual machine 520.

Meanwhile, the third virtual machine 540, which is a guest virtual machine, may execute a window manager 547 configured to control a window of an image in which an overlay will be generated or displayed and an input and output client interface 542 for data communication with the first virtual machine 520.

Meanwhile, the first virtual machine 520 in the processor 175 may execute a camera interface PHC configured to receive camera data from an external camera device and a camera manager CMA configured to register a request for transmission of camera data from the second virtual machine 530 or the third virtual machine 540 and to transmit the camera data to the second virtual machine 530 or the third virtual machine 540 based on registered request.

Consequently, the data received from the outside may be efficiently shared. In particular, the camera data received from the outside may be efficiently shared. In addition, the camera data received from the outside may be efficiently shared even though the number of virtual machines that are driven is increased.

Meanwhile, the first virtual machine 520 in the processor 175 may further execute an input and output server interface 522 for data communication with the second virtual machine 530 or the third virtual machine 540, which is a guest virtual machine, and in response to a request for transmission of the same camera data from the second virtual machine 530 and the third virtual machine 540, the camera manager CMA may transmit first camera data to the input and output server interface 522. Consequently, the camera data may be efficiently shared.

Meanwhile, the input and output server interface 522 may write the first camera data in the shared memory 508 based on the hypervisor 505, and the second virtual machine 530 and the third virtual machine 540 may receive the first camera data through the shared memory 508. Consequently, the camera data may be efficiently shared. In particular, the camera data may be shared in a 1:N manner in response to the number of guest virtual machines.

Meanwhile, the camera manager CMA may be configured to initialize the camera device or the camera interface PHC at the time of booting, and after booting, and register the request for transmission of the camera data from the second virtual machine 530 or the third virtual machine 540. After booting, therefore, the camera data may be efficiently shared.

Meanwhile, the camera manager CMA may control setting of the camera data, route control of the camera data, and a stream server of the camera data. Consequently, the camera data may be efficiently managed.

For example, the camera interface PHC may receive camera data from a plurality of camera devices in the vehicle, and may transmit the received camera data from each camera device to the camera manager CMA.

The camera manager CMA may set the camera data from each camera device, and may generate an around view image using the plurality of camera data.

Meanwhile, the camera manager CMA may receive the camera data from each camera device in a stream mode, may perform signal processing therefor, and may transmit the same to the second virtual machine 530 or the third virtual machine 540.

Figure 12:
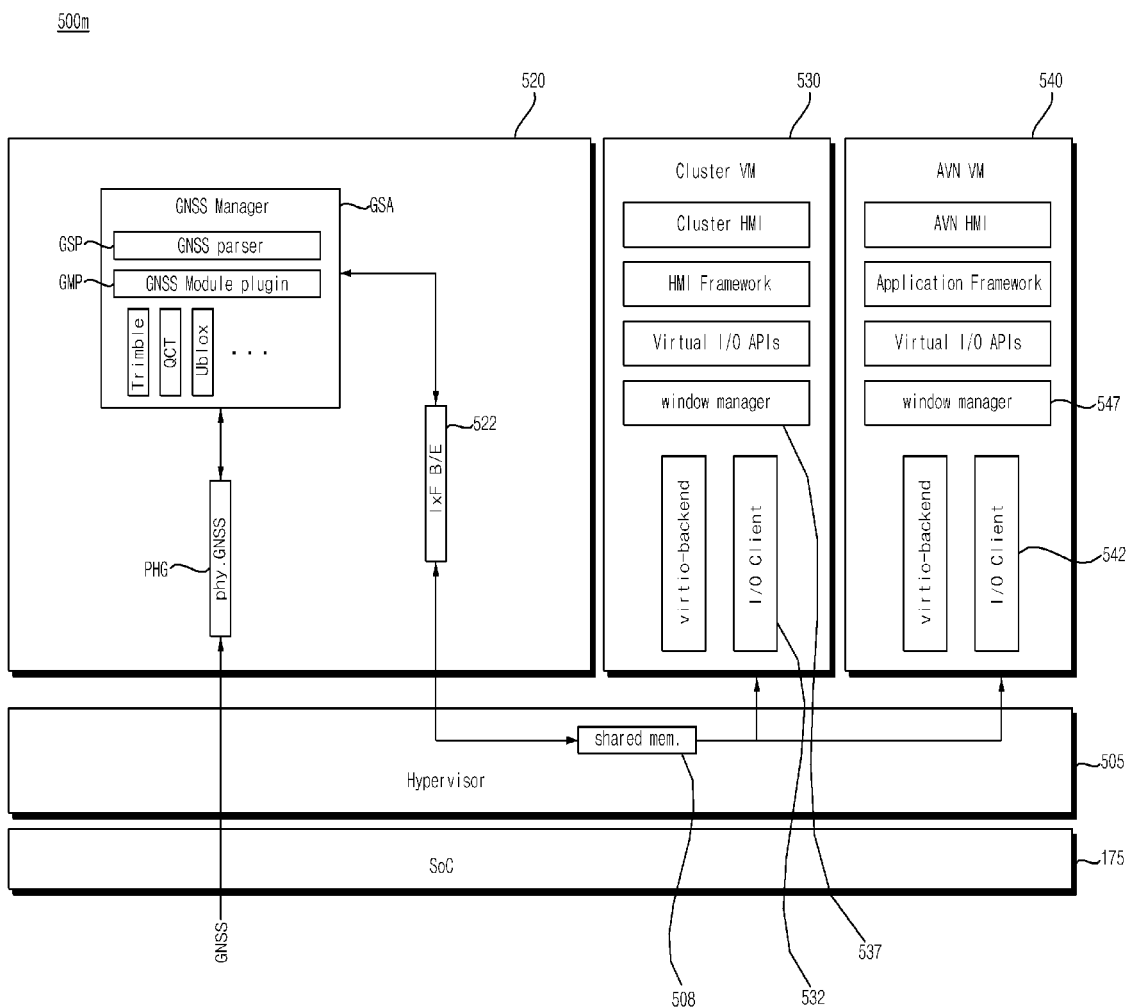
FIG. 12 is a view showing the case in which a position information manager is executed in the system driven in the signal processing device of FIG. 10.

FIG. 12 is a view showing the case in which the position information manager is executed in the system driven in the signal processing device of FIG. 10.

Referring to the figure, the system 500*m* driven in the signal processing device 170 according to the embodiment of the present disclosure is different from the system 500*m* of FIG. 12 in that the position information manager GSA, not the camera manager CMA, is executed in the first virtual machine 520.

Hereinafter, a description will be given based on such difference.

The first virtual machine 520 in the processor 175 may execute a position information interface PHG configured to receive position information data from a GPS device, which is an external position information receiving device, and a position information manager GSA configured to register a request for transmission of position information data from the second virtual machine 530 or the third virtual machine 540 and to transmit the position information data to the second virtual machine 530 or the third virtual machine 540 based on registered request. Consequently, the position information data may be efficiently shared.

Meanwhile, the first virtual machine 520 in the processor 175 may further execute an input and output server interface 522 for data communication with the second virtual machine 530 or the third virtual machine 540, which is a guest virtual machine, and in response to a request for transmission of the same position information data from the second virtual machine 530 and the third virtual machine 540, the position information manager GSA may transmit first position information data to the input and output server interface 522. Consequently, the position information data may be efficiently shared.

Meanwhile, the input and output server interface 522 may write the first position information data in the shared memory 508 based on the hypervisor 505, and the second virtual machine 530 and the third virtual machine 540 may receive the first position information data through the shared memory 508. Consequently, the position information data may be efficiently shared.

For example, when the first position information data are transmitted to the second virtual machine 530 and the third virtual machine 540, first position information based on the first position information data may be the identically displayed on the first display 180*a* and the second display 180*b*.

Meanwhile, the position information manager GSA may selectively parse position information data, and may selectively transmit the parsed position information data or unparsed position information data to the second virtual machine 530 or the third virtual machine 540. Consequently, the position information data may be efficiently transmitted.

For example, in response to no parser being provided in the second virtual machine 530, the position information manager GSA may parse position information data, and may be configured to transmit the parsed position information data to the second virtual machine 530.

As another example, in response to a parser being provided and executed in the third virtual machine 540, the position information manager GSA may be configured to transmit bypassed position information data to the third virtual machine 540 without parsing of the position information data. Consequently, the position information data may be efficiently transmitted.

Figure 13:
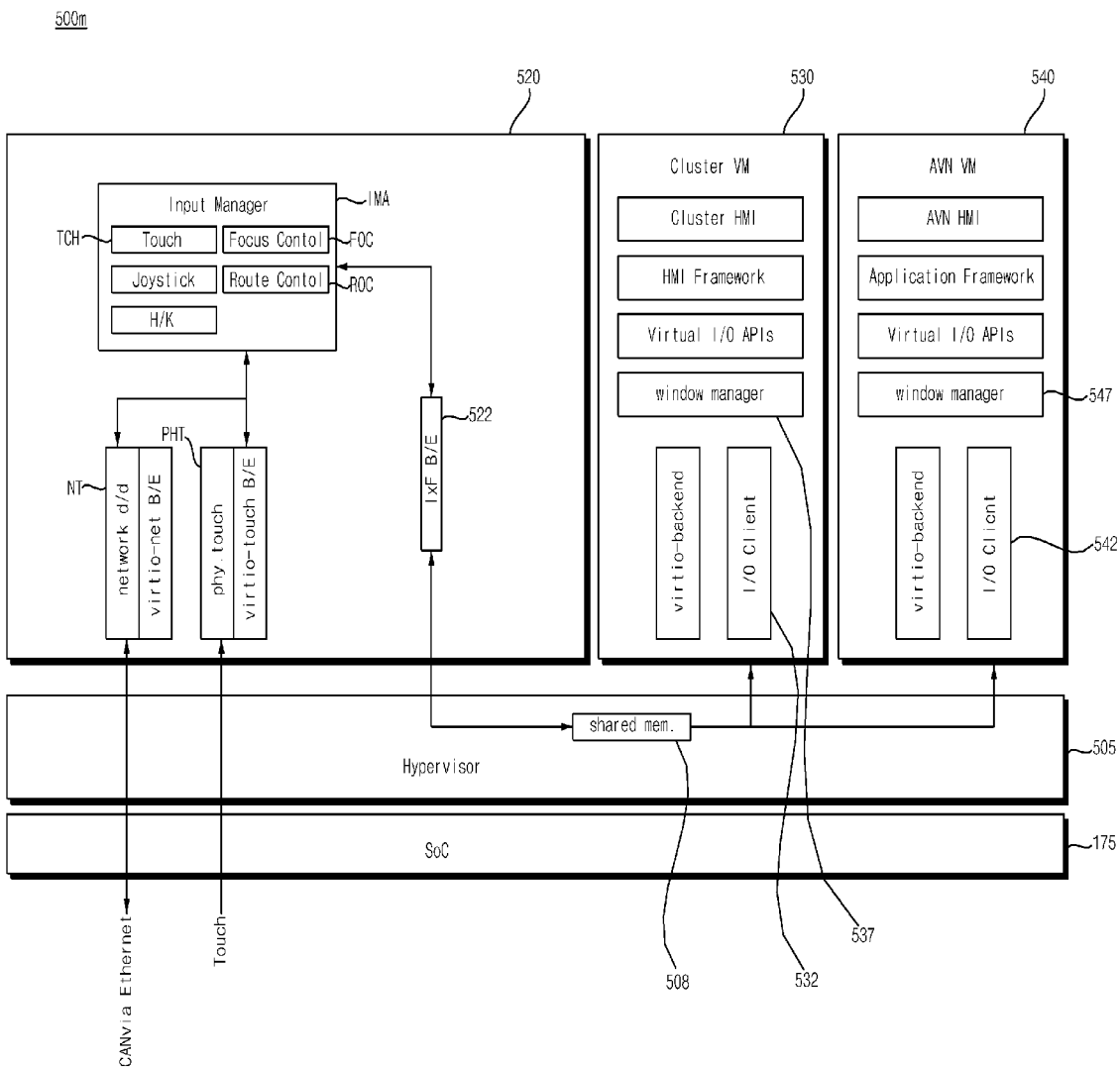
FIG. 13 is a view showing the case in which a position input manager is executed in the system driven in the signal processing device of FIG. 10.

FIG. 13 is a view showing the case in which the position input manager is executed in the system driven in the signal processing device of FIG. 10.

Referring to the figure, the system 500*m* driven in the signal processing device 170 according to the embodiment of the present disclosure is different from the system 500*m* of FIG. 12 in that the input manager IMA, not the camera manager CMA, is executed in the first virtual machine 520.

Hereinafter, a description will be given based on such difference.

The first virtual machine 520 in the processor 175 may execute an input interface PHT configured to receive input data from an external input device and an input manager IMA configured to, in response to the received input data being touch input data corresponding to the second virtual machine 530 or the third virtual machine 540, control transmission of the touch input data to the second virtual machine 530 or the third virtual machine 540. Consequently, the touch input data may be efficiently shared.

Meanwhile, the input manager IMA may execute a touch input manager TCH configured to process touch input, focus control FOC of input data, and route control ROC of input data.

Meanwhile, the input data may include touch input data, hardware key input data, and joystick input data.

Meanwhile, the input interface PHT may receive the touch input data, and the other input data may be received through a second input interface NT.

For example, the hardware key input data may be received by the input manager IMA through the second input interface NT based on CAN communication.

Meanwhile, the first virtual machine 520 in the processor 175 may further execute an input and output server interface 522 for data communication with the second virtual machine 530 or the third virtual machine 540, which is a guest virtual machine, and in response to the input data being touch input data corresponding to the second virtual machine 530 or the third virtual machine 540, the input manager IMA may transmit the touch input data to the input and output server interface 522. Consequently, the touch input data may be efficiently shared.

Meanwhile, the input and output server interface 522 may write the touch input data in the shared memory 508 based on the hypervisor 505, and the second virtual machine 530 or the third virtual machine 540 may receive the touch input data through the shared memory 508. Consequently, the touch input data may be efficiently shared.

For example, in response to first touch input being performed to a first area of the first display 180*a*, the input manager IMA in the first virtual machine 520 may be configured to receive first touch input data and transmit the first touch input data to the second virtual machine 530.

As another example, in response to second touch input being performed to a second area of the second display 180*b*, the input manager IMA in the first virtual machine 520 may be configured to receive second touch input data and transmit the second touch input data to the third virtual machine 540. Consequently, the touch input data may be efficiently processed.

As a further example, in response to first touch input being performed to the first area of the first display 180*a*, the input manager IMA in the first virtual machine 520 may be configured to receive first touch input data and transmit the first touch input data to the second virtual machine 530 and the third virtual machine 540. Consequently, 1:N sharing of touch input data may be achieved.

Figure 14:
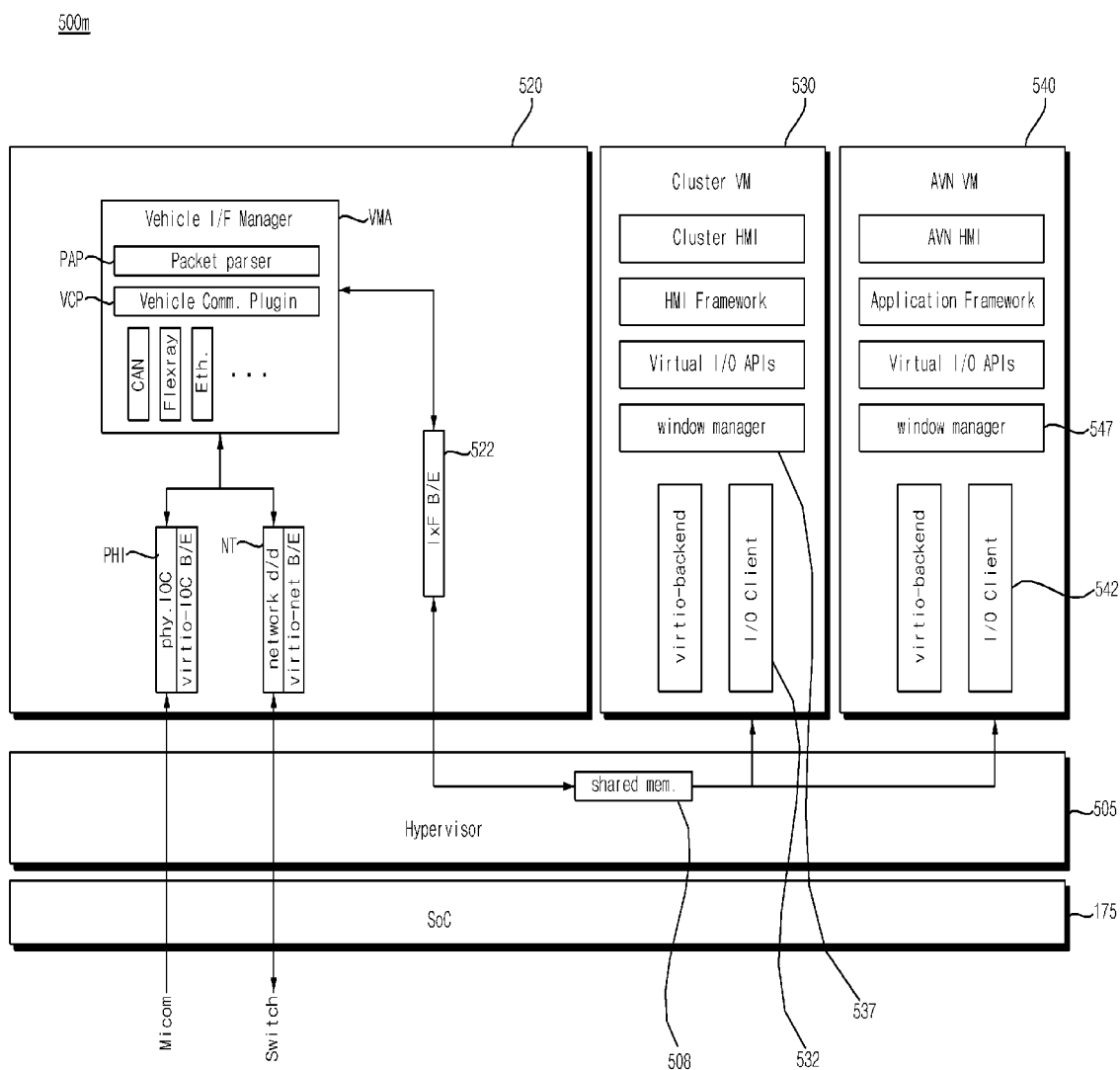
FIG. 14 is a view showing the case in which a sensor manager is executed in the system driven in the signal processing device of FIG. 10.

FIG. 14 is a view showing the case in which the sensor manager is executed in the system driven in the signal processing device of FIG. 10.

Referring to the figure, the system 500*m* driven in the signal processing device 170 according to the embodiment of the present disclosure is different from the system 500*m* of FIG. 12 in that the sensor manager VMA, not the camera manager CMA, is executed in the first virtual machine 520.

Hereinafter, a description will be given based on such difference.

The first virtual machine 520 in the processor 175 may execute a sensor interface PHI configured to receive sensor data from an external sensor device or microcomputer and a sensor manager VMA configured to register a request for transmission of sensor data from the second virtual machine 530 or the third virtual machine 540 and to transmit the sensor data to the second virtual machine 530 or the third virtual machine 540 based on registered request. Consequently, the sensor data may be efficiently shared.

For example, the sensor interface PHI may receive sensor data from the external sensor device or microcomputer based on CAN communication.

As another example, the first virtual machine 520 in the processor 175 may receive sensor data through the second interface NT based on Ethernet communication.

Meanwhile, the first virtual machine 520 in the processor 175 may further execute an input and output server interface 522 for data communication with the second virtual machine 530 or the third virtual machine 540, which is a guest virtual machine, and in response to a request for transmission of the same sensor data from the second virtual machine 530 and the third virtual machine 540, the sensor manager VMA may transmit first sensor data to the input and output server interface 522. Consequently, the sensor data may be efficiently shared.

Meanwhile, the input and output server interface 522 may write the first sensor data in the shared memory 508 based on the hypervisor 505, and the second virtual machine 530 and the third virtual machine 540 may receive the first sensor data through the shared memory 508. Consequently, the sensor data may be efficiently shared.

Meanwhile, the sensor manager VMA in the first virtual machine 520 may be configured to receive and process wheel speed sensor data of the vehicle, and transmit an overlay indicating the processed wheel speed sensor data or speed information corresponding to the processed wheel speed sensor data to at least one of the second virtual machine 530 or the third virtual machine 540. Consequently, the wheel speed sensor data may be efficiently shared.

Meanwhile, the sensor manager VMA may selectively parse sensor data, and may be configured to selectively transmit the parsed sensor data or unparsed sensor data to the second virtual machine 530 or the third virtual machine 540. Consequently, the sensor data may be efficiently transmitted.

For example, in response to no parser being provided in the second virtual machine 530, the sensor manager VMA may parse sensor data, and may be configured to transmit the parsed sensor data to the second virtual machine 530.

As another example, in response to a parser being provided and executed in the third virtual machine 540, the sensor manager VMA may be configured to transmit bypassed sensor data to the third virtual machine 540 without parsing of the sensor data. Consequently, the sensor data may be efficiently transmitted.

Figure 15:
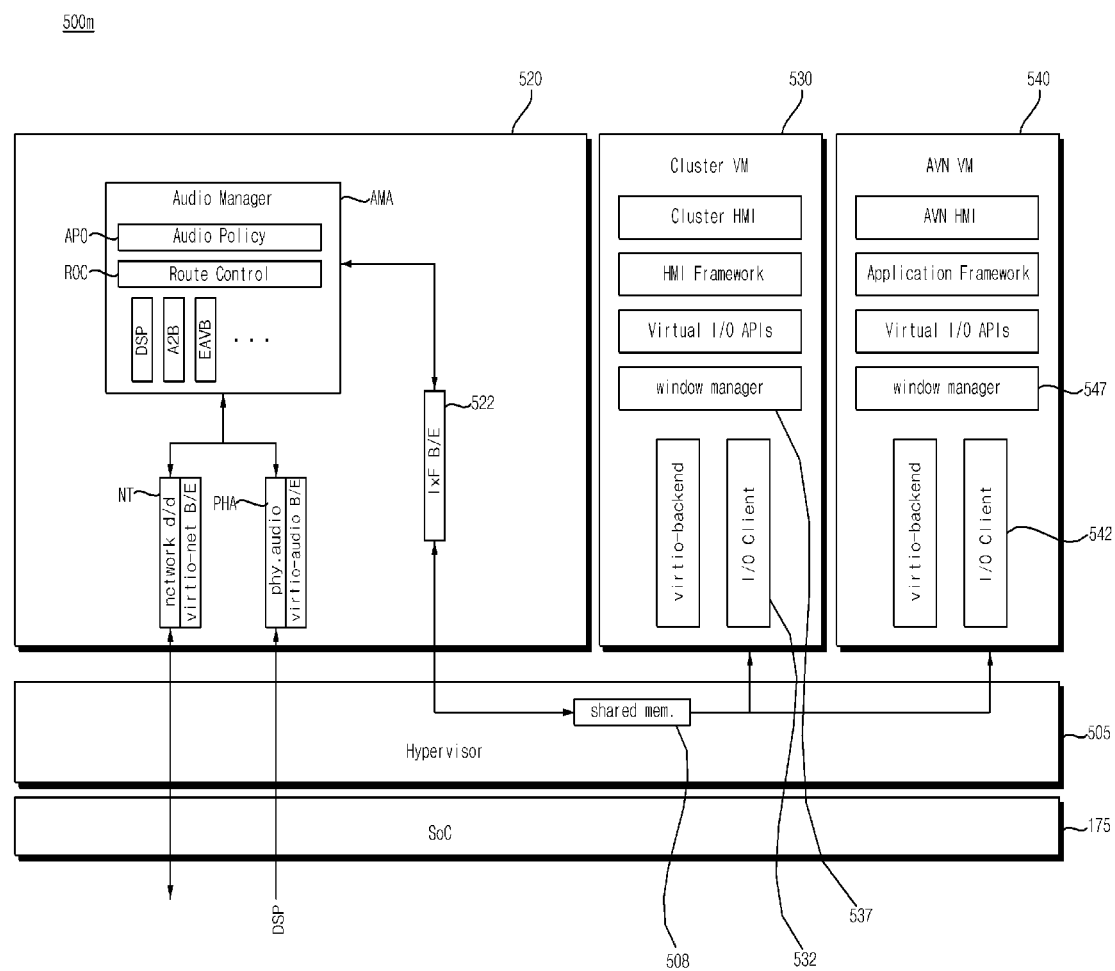
FIG. 15 is a view showing the case in which an audio manager is executed in the system driven in the signal processing device of FIG. 10.

FIG. 15 is a view showing the case in which the audio manager is executed in the system driven in the signal processing device of FIG. 10.

Referring to the figure, the system 500*m* driven in the signal processing device 170 according to the embodiment of the present disclosure is different from the system 500*m* of FIG. 12 in that the audio manager AMA, not the camera manager CMA, is executed in the first virtual machine 520.

Hereinafter, a description will be given based on such difference.

The first virtual machine 520 in the processor 175 may execute an audio interface PHA configured to receive audio data from an external audio device and an audio manager AMA configured to register a request for transmission of audio data from the second virtual machine 530 or the third virtual machine 540 and to transmit the audio data to the second virtual machine 530 or the third virtual machine 540 based on registered request. Consequently, the audio data may be efficiently shared.

For example, the audio interface PHA may receive stream-based audio data based on Ethernet communication.

As another example, the first virtual machine 520 in the processor 175 may receive audio data through the second interface NT based on CAN communication.

Meanwhile, the first virtual machine 520 in the processor 175 may further execute an input and output server interface 522 for data communication with the second virtual machine 530 or the third virtual machine 540, which is a guest virtual machine, in response to a request for transmission of the same audio data from the second virtual machine 530 and the third virtual machine 540, the audio manager AMA may transmit first audio data to the input and output server interface 522, the input and output server interface 522 may write the first audio data in the shared memory 508 based on the hypervisor 505, and the second virtual machine 530 and the third virtual machine 540 may receive the same first audio data through the shared memory 508. Consequently, the audio data may be efficiently shared.

Meanwhile, in response to the audio data being transmitted to the second virtual machine 530 or the third virtual machine 540, the audio manager AMA may be configured to adjust volume or reproduce the audio data for each of the second virtual machine 530 and the third virtual machine 540. Consequently, the audio data may be efficiently managed.

Meanwhile, the second virtual machine 530 or the third virtual machine 540 may transmit a start event to the first virtual machine 520, and after reception of the start event, the first virtual machine 520 may continuously transmit the audio data to the second virtual machine 530 or the third virtual machine 540.

Meanwhile, the second virtual machine 530 or the third virtual machine 540 may transmit a stop event to the first virtual machine 520, and after reception of the stop event, the first virtual machine 520 may stop transmission of the audio data to the second virtual machine 530 or the third virtual machine 540.

Figure 16:
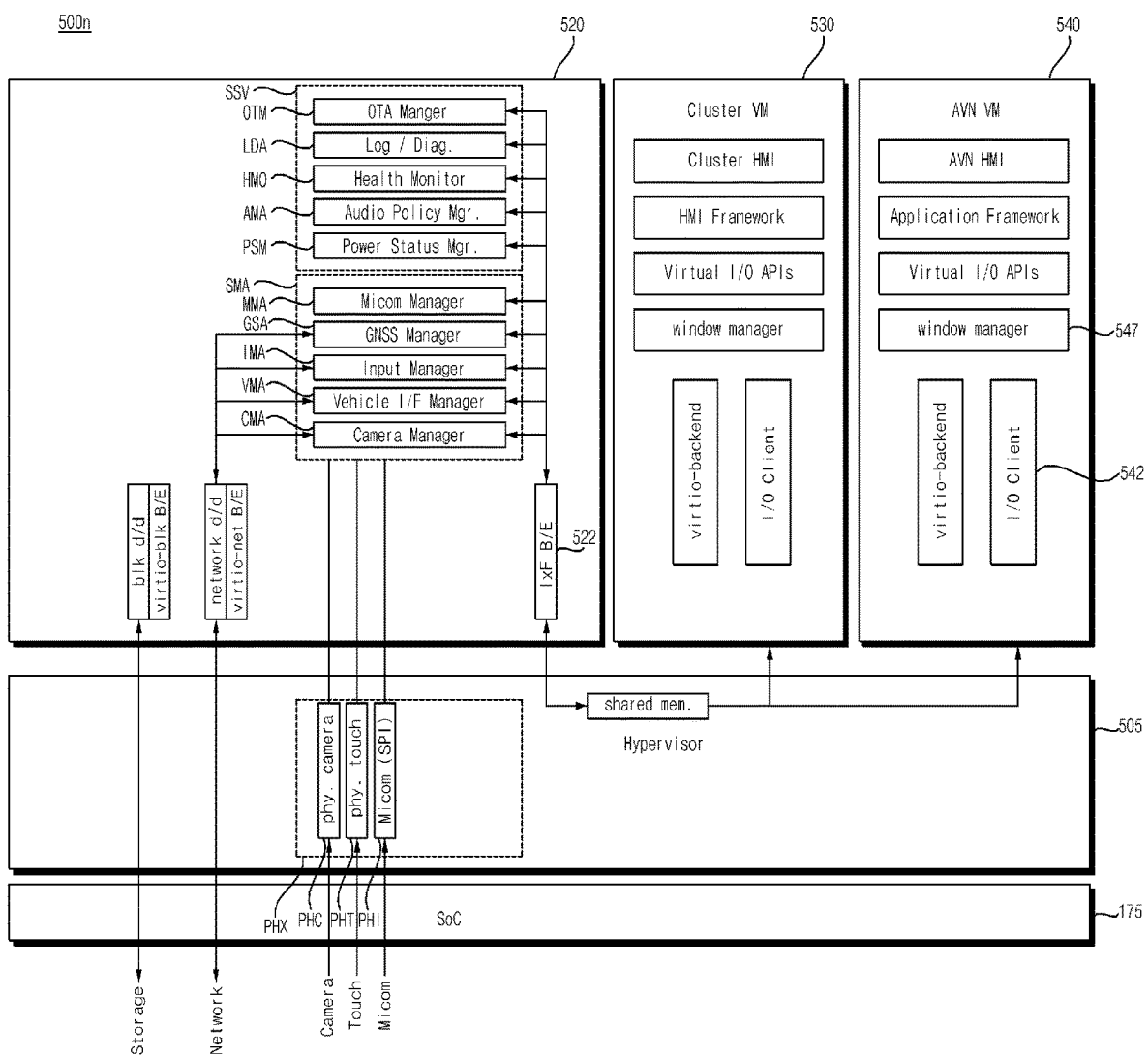
FIG. 16 is a view showing a system driven in a signal processing device according to another embodiment of the present disclosure.

FIG. 16 is a view showing a system driven in a signal processing device according to another embodiment of the present disclosure.

Referring to the figure, the system 500*m* driven in the signal processing device 170 according to the embodiment of the present disclosure is different in construction in the first virtual machine 520 from the system 500*m* of FIG. 12.

Hereinafter, a description will be given based on such difference.

A first virtual machine 520 in a processor 175 may execute a system manager SMA, and the system manager SMA may selectively execute a camera manager CMA, a position information manager GSA, an input manger IMA, a sensor manager VMA, and a microcomputer manager MMA.

Unlike FIG. 10, an audio manager AMA may be executed in a system supervisor, not the system manager SMA.

Meanwhile, the system supervisor may execute an audio manager AMA, a health monitor HMO for body information monitoring, power management PSM for a power state or a boot mode, a log manager LDA for management, such as log, and an over the air (OTA) manager OTM for OTA management.

Meanwhile, in order to transmit external data to the system manager SMA or the system supervisor, FIG. 16 illustrates that some interfaces are disposed or executed in a hypervisor 505, although FIGS. 10 to 15 illustrate that each interface is disposed or executed in the first virtual machine 520.

The figure illustrates that an input and output server interface 522 is executed in the first virtual machine 520 and that interfaces PHX, including a camera interface PHC configured to receive camera data from an external camera device, an input interface PHT configured to receive touch input data from an external input device, and a sensor interface PHI configured to receive sensor data from an external sensor device or microcomputer, are disposed or executed in the hypervisor 505.

Figure 17:
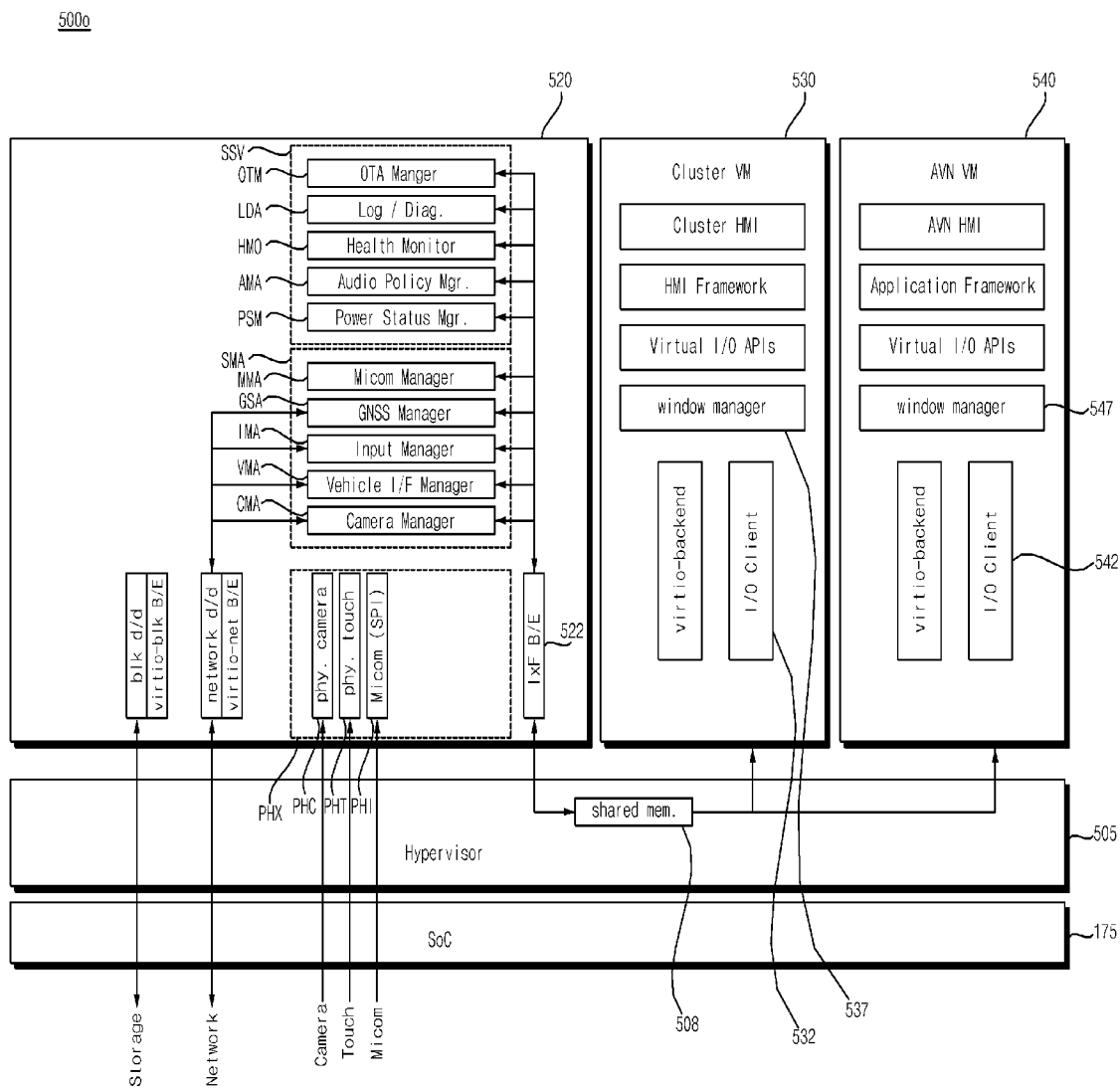
FIG. 17 is a view showing a system driven in a signal processing device according to a further embodiment of the present disclosure.

FIG. 17 is a view showing a system driven in a signal processing device according to a further embodiment of the present disclosure.

Referring to the figure, the system 500*o* driven in the signal processing device 170 according to the embodiment of the present disclosure is different in construction in the first virtual machine 520 from the system 500*m* of FIG. 12.

Hereinafter, a description will be given based on such difference.

A first virtual machine 520 in a processor 175 may execute a system manager SMA, and the system manager SMA may selectively execute a camera manager CMA, a position information manager GSA, an input manger IMA, a sensor manager VMA, and a microcomputer manager MMA.

Unlike FIG. 10, an audio manager AMA may be executed in a system supervisor, not the system manager SMA.

Meanwhile, the system supervisor may execute an audio manager AMA, a health monitor HMO for body information monitoring, power management PSM for a power state or a boot mode, a log manager LDA for management, such as log, and an over the air (OTA) manager OTM for OTA management.

Meanwhile, unlike FIG. 16, interfaces PHX, including a camera interface PHC configured to receive camera data from an external camera device, an input interface PHT configured to receive touch input data from an external input device, and a sensor interface PHI configured to receive sensor data from an external sensor device or microcomputer, may be disposed or executed in the first virtual machine 520 in the processor 175.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device comprising a processor configured to perform signal processing for a display located in a vehicle, wherein the processor is configured to execute a server virtual machine and at least one guest virtual machine on a hypervisor in the processor, the server virtual machine in the processor is configured to:
    execute an input and output server interface for data communication with the at least one guest virtual machine, and
    the at least one guest virtual machine is configured to execute an input and output client interface for data communication with the server virtual machine,
    in response to receiving a request for data transmission from the input and output client interface in the at least one guest virtual machine, the input and output server interface in the server virtual machine is configured to transmit shared data to a shared memory set based on the hypervisor, and
    the input and output client interface in the at least one guest virtual machine is configured to receive the shared data in a shared memory,
    wherein only the server virtual machine is configured to receive CAN (Controller Area Network) communication data, and
    wherein the server virtual machine receives the CAN communication data.

2. The signal processing device of claim 1, wherein the server virtual machine in the processor further executes a camera interface to receive camera data from a camera device and a camera manager to register a request for transmission of camera data from a first guest virtual machine or a second guest virtual machine and to transmit the camera data to the first guest virtual machine or the second guest virtual machine based on a registered request,
    in response to a request for transmission of same camera data from the first guest virtual machine and the second guest virtual machine, the camera manager is configured to transmit first camera data to the input and output server interface.

3. The signal processing device of claim 2, wherein
    the input and output server interface writes the first camera data in the shared memory based on the hypervisor, and
    the first guest virtual machine and the second guest virtual machine receive the first camera data through the shared memory.

4. The signal processing device of claim 2, wherein the camera manager is configured to initialize the camera device or the camera interface upon booting of the processor, and register the request for transmission of the camera data from the first guest virtual machine or the second guest virtual machine after booting.

5. The signal processing device of claim 2, wherein the camera manager controls setting of the camera data, route control of the camera data, and a stream server of the camera data.

6. The signal processing device of claim 2, wherein the server virtual machine in the processor further executes a position information interface to receive position information from a position information receiving device and a position information manager to register a request for transmission of position information from the first guest virtual machine or the second guest virtual machine and to transmit the position information to the first guest virtual machine or the second guest virtual machine based on the registered request.

7. The signal processing device of claim 6, wherein
    in response to a request for transmission of same position information from the first guest virtual machine and the second guest virtual machine, the position information manager is configured to transmit first position information to the input and output server interface.

8. The signal processing device of claim 7, wherein
    the input and output server interface writes the first position information in the shared memory based on the hypervisor, and
    the first guest virtual machine and the second guest virtual machine receive the first position information through the shared memory.

9. The signal processing device of claim 6, wherein the position information manager is configured to:
    in response to no parser being provided in the first guest virtual machine, parse the position information, and transmit the parsed position information to the first guest virtual machine; and
    in response to no parser being provided in the second guest virtual machine, transmit unparsed position information to the second guest virtual machine.

10. The signal processing device of claim 2, wherein the server virtual machine in the processor further executes an input interface to receive input data from an input device and an input manager to, in response to the received input data being touch input data corresponding to the first guest virtual machine or the second guest virtual machine, control transmission of the touch input data to the first guest virtual machine or the second guest virtual machine.

11. The signal processing device of claim 10, wherein
in response to the input data being the touch input data corresponding to the first guest virtual machine or the second guest virtual machine, the input manager is configured to transmit the touch input data to the input and output server interface.

12. The signal processing device of claim 11, wherein
the input and output server interface writes the touch input data in the shared memory based on the hypervisor, and
the first guest virtual machine or the second guest virtual machine receives the touch input data through the shared memory.

13. The signal processing device of claim 2, wherein the server virtual machine in the processor further executes a sensor interface to receive sensor data from a sensor device or microcomputer and a sensor manager to register a request for transmission of sensor data from the first guest virtual machine or the second guest virtual machine and to transmit the sensor data to the first guest virtual machine or the second guest virtual machine based on the registered request.

14. The signal processing device of claim 13, wherein
in response to a request for transmission of same sensor data from the first guest virtual machine and the second guest virtual machine, the sensor manager is configured to transmit first sensor data to the input and output server interface,
the input and output server interface writes the first sensor data in the shared memory based on the hypervisor, and
the first guest virtual machine and the second guest virtual machine receive the first sensor data through the shared memory.

15. The signal processing device of claim 2, wherein the server virtual machine receives and processes wheel speed sensor data of the vehicle, and transmits speed information corresponding to the processed wheel speed sensor data to at least one of the first guest virtual machine or the second guest virtual machine.

16. The signal processing device of claim 2, wherein the server virtual machine in the processor further executes an audio interface to receive audio data from an audio device and an audio manager to register a request for transmission of audio data from the first guest virtual machine or the second guest virtual machine and to transmit the audio data to the first guest virtual machine or the second guest virtual machine based on a registered request.

17. The signal processing device of claim 16, wherein
in response to a request for transmission of same audio data from the first guest virtual machine and the second guest virtual machine, the audio manager is configured to transmit first audio data to the input and output server interface,
the input and output server interface writes the first audio data in the shared memory based on the hypervisor, and
the first guest virtual machine and the second guest virtual machine receive the first audio data through the shared memory.

18. The signal processing device of claim 16, wherein,
in response to the audio data being transmitted to the first guest virtual machine or the second guest virtual machine, the audio manager is configured to adjust volume or reproduce the audio data for each of the first guest virtual machine and the second guest virtual machine.

19. A display apparatus for vehicles, the display apparatus comprising:
a first display;
a second display; and
a signal processing device comprising a processor configured to perform signal processing for the first display and the second display, wherein
the processor is configured to execute a server virtual machine and at least one guest virtual machine on a hypervisor in the processor,
execute an input and output server interface for data communication with the at least one guest virtual machine, and
the at least one guest virtual machine is configured to execute an input and output client interface for data communication with the server virtual machine,
in response to receiving a request for data transmission from the input and output client interface in the at least one guest virtual machine, the input and output server interface in the server virtual machine is configured to transmit shared data to a shared memory set based on the hypervisor, and
the input and output client interface in the at least one guest virtual machine is configured to receive the shared data in a shared memory,
wherein only the server virtual machine is configured to receive CAN (Controller Area Network) communication data, and
wherein the server virtual machine receives the CAN communication data.

* * * * *